(12) United States Patent
Kato

(10) Patent No.: US 10,067,570 B2
(45) Date of Patent: Sep. 4, 2018

(54) NON-CONTACT OPERATION DETECTION DEVICE

(71) Applicant: CLARION CO., LTD., Saitama (JP)

(72) Inventor: Shizue Kato, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/310,936

(22) PCT Filed: Mar. 24, 2015

(86) PCT No.: PCT/JP2015/058914
§ 371 (c)(1),
(2) Date: Nov. 14, 2016

(87) PCT Pub. No.: WO2016/002270
PCT Pub. Date: Jan. 7, 2016

(65) Prior Publication Data
US 2017/0102777 A1 Apr. 13, 2017

(30) Foreign Application Priority Data
Jun. 30, 2014 (JP) ................. 2014-133874

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *B60R 16/037* (2013.01); *G06F 3/01* (2013.01);
(Continued)

(58) Field of Classification Search
CPC . G06F 3/017; B60K 35/00; B60K 2350/1028; B60K 2350/1036;
(Continued)

(56) References Cited

U.S. PATENT DOCUMENTS

2009/0278915 A1* 11/2009 Kramer ................. G06F 3/017
348/48
2009/0284467 A1 11/2009 Itoh et al.
(Continued)

FOREIGN PATENT DOCUMENTS

EP 2660682 A2 5/2013
JP 2000-66805 A 3/2000
(Continued)

OTHER PUBLICATIONS

Notice of Reasons for Refusal mailed by Japan Patent Office dated Jun. 13, 2017 in the corresponding Japanese patent application No. 2016-531139.
(Continued)

Primary Examiner — Mark Regn
(74) Attorney, Agent, or Firm — IP Business Solutions, LLC

(57) ABSTRACT

To improve the user's convenience related to non-contact operation. An on-vehicle device 1 includes a control section that is configured to detect non-contact operation, and is configured, in a first mode, to analyze the detected non-contact operation and determine, on the basis of a first rule, whether or not the non-contact operation is an effective operation, and in a second mode, to analyze the detected non-contact operation and determine, on the basis of a second rule, whether or not the non-contact operation is an effective operation.

13 Claims, 16 Drawing Sheets

(51) Int. Cl.
*B60R 16/037* (2006.01)
*G06F 3/038* (2013.01)

(52) U.S. Cl.
CPC ........ *G06F 3/038* (2013.01); *B60K 2350/104* (2013.01); *B60K 2350/1028* (2013.01); *B60K 2350/1036* (2013.01); *B60K 2350/1052* (2013.01); *B60K 2350/2017* (2013.01); *B60R 2300/207* (2013.01); *B60Y 2400/92* (2013.01); *G06F 2203/04101* (2013.01)

(58) Field of Classification Search
CPC ...... B60K 2350/104; B60K 2350/1052; B60K 2350/2017; B60R 16/037; B60R 2300/207; B60Y 2400/92
USPC .......................................................... 345/156
See application file for complete search history.

(56) References Cited

U.S. PATENT DOCUMENTS

| | | | |
|---|---|---|---|
| 2012/0146903 | A1 | 6/2012 | Arihara et al. |
| 2013/0135188 | A1 | 5/2013 | Yin et al. |
| 2013/0155237 | A1* | 6/2013 | Paek ................... G06F 1/1632 348/148 |
| 2014/0062858 | A1 | 3/2014 | Yasumoto |

FOREIGN PATENT DOCUMENTS

| | | | |
|---|---|---|---|
| JP | 2005-135439 | A | 5/2005 |
| JP | 2007-072564 | A | 3/2007 |
| JP | 2007-080214 | A | 3/2007 |
| JP | 2009-276993 | A | 11/2009 |
| JP | 2010-129069 | A | 6/2010 |
| JP | 2013012158 | * | 6/2011 |
| JP | 2012-123617 | A | 6/2012 |
| JP | 2013-12158 | A | 1/2013 |
| JP | 2013-195326 | A | 9/2013 |
| JP | 2014-048680 | A | 3/2014 |
| WO | 2011069148 | A1 | 6/2011 |
| WO | 2013074866 | A1 | 5/2013 |

OTHER PUBLICATIONS

International Search Report issued for corresponding PCT/JP2015/058914 application.
International Preliminary Report on Patentability issued for corresponding PCT/JP2015/058914.
Written Opinion of the International Searching Authority issued for corresponding PCT/JP2015/058914.
Extended European Search Report mailed by European Patent Office dated Dec. 8, 2017 in the corresponding European patent application No. 15814009.5—1972.
Japanese Office Action mailed by Japanese Patent Office dated Jan. 9, 2018 in the corresponding Japanese patent application No. 2016-531139.

* cited by examiner

FIG. 7
G6
(A) 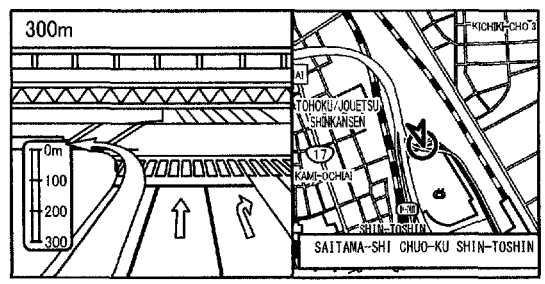
G7
(B) 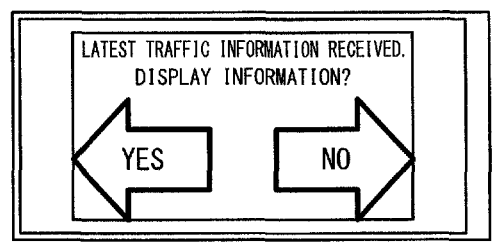

FIG.11

| PEAK ORDER PATTERN | ORDER OF PEAK OF DETECTION VALUE OF EACH OF SENSOR SECTIONS |
|---|---|
| PATTERN P1 | SENSOR S1 → SENSOR S2 → SENSOR S4 → SENSOR S3 |
| PATTERN P2 | SENSOR S1 → SENSOR S2 → SENSOR S3 → SENSOR S4 |
| PATTERN P3 | SENSOR S1 → SENSOR S4 → SENSOR S2 → SENSOR S3 |
| PATTERN P4 | SENSOR S1 → SENSOR S4 → SENSOR S3 → SENSOR S2 |
| PATTERN P5 | SENSOR S4 → SENSOR S1 → SENSOR S2 → SENSOR S3 |
| PATTERN P6 | SENSOR S4 → SENSOR S1 → SENSOR S3 → SENSOR S2 |
| PATTERN P7 | SENSOR S4 → SENSOR S3 → SENSOR S2 → SENSOR S1 |
| PATTERN P8 | SENSOR S4 → SENSOR S3 → SENSOR S1 → SENSOR S2 |
| PATTERN P9 | SENSOR S3 → SENSOR S4 → SENSOR S2 → SENSOR S1 |
| PATTERN P10 | SENSOR S3 → SENSOR S4 → SENSOR S1 → SENSOR S2 |
| PATTERN P11 | SENSOR S3 → SENSOR S2 → SENSOR S4 → SENSOR S1 |
| PATTERN P12 | SENSOR S3 → SENSOR S2 → SENSOR S1 → SENSOR S4 |
| PATTERN P13 | SENSOR S2 → SENSOR S3 → SENSOR S4 → SENSOR S1 |
| PATTERN P14 | SENSOR S2 → SENSOR S3 → SENSOR S1 → SENSOR S4 |
| PATTERN P15 | SENSOR S2 → SENSOR S1 → SENSOR S4 → SENSOR S3 |
| PATTERN P16 | SENSOR S2 → SENSOR S1 → SENSOR S3 → SENSOR S4 |

| | PATTERN | TIME DIFFERENCE COMPARISON INFORMATION | PREDETERMINED DIRECTION OPERATION | FIRST RATIO | SECOND RATIO |
|---|---|---|---|---|---|
| | | FA1 | FA2 | FA3 | FA4 | FA5 |
| R1 → | PATTERN P1 | KA<KB | LOWER DIRECTION OPERATION | VALUE A1min $\leq \alpha \leq$ VALUE A1max | VALUE B1min $\leq \beta \leq$ VALUE B1max |
| R2 → | PATTERN P1 | KA$\geq$KB | LOWER RIGHT DIRECTION OPERATION | VALUE A2min $\leq \alpha \leq$ VALUE A2max | VALUE B2min $\leq \beta \leq$ VALUE B2max |
| R3 → | PATTERN P2 | ANY | LOWER DIRECTION OPERATION | VALUE A3min $\leq \alpha \leq$ VALUE A3max | VALUE B3min $\leq \beta \leq$ VALUE B3max |
| | PATTERN P3 | KA<KB | RIGHT DIRECTION OPERATION | VALUE A4min $\leq \alpha \leq$ VALUE A4max | VALUE B4min $\leq \beta \leq$ VALUE B4max |
| | PATTERN P3 | KA$\geq$KB | LOWER RIGHT DIRECTION OPERATION | VALUE A5min $\leq \alpha \leq$ VALUE A5max | VALUE B5mh $\leq \beta \leq$ VALUE B5max |
| | PATTERN P4 | ANY | RIGHT DIRECTION OPERATION | VALUE A6min $\leq \alpha \leq$ VALUE A6max | VALUE B6min $\leq \beta \leq$ VALUE B6max |
| | PATTERN P5 | KA<KB | RIGHT DIRECTION OPERATION | VALUE A7min $\leq \alpha \leq$ VALUE A7max | VALUE B7min $\leq \beta \leq$ VALUE B7max |
| | PATTERN P5 | KA$\geq$KB | LOWER RIGHT DIRECTION OPERATION | VALUE A8min $\leq \alpha \leq$ VALUE A8max | VALUE B8min $\leq \beta \leq$ VALUE B8max |
| | PATTERN P6 | KA<KB | RIGHT DIRECTION OPERATION | VALUE A9min $\leq \alpha \leq$ VALUE A9max | VALUE B9min $\leq \beta \leq$ VALUE B9max |
| | PATTERN P6 | KA$\geq$KB | UPPER RIGHT DIRECTION OPERATION | VALUE A10min $\leq \alpha \leq$ VALUE A10max | VALUE B10min $\leq \beta \leq$ VALUE B10max |
| | PATTERN P7 | ANY | UPPER DIRECTION OPERATION | VALUE A11min $\leq \alpha \leq$ VALUE A11max | VALUE B11min $\leq \beta \leq$ VALUE B11max |
| | PATTERN P8 | KA<KB | UPPER RIGHT DIRECTION OPERATION | VALUE A12min $\leq \alpha \leq$ VALUE A12max | VALUE B12min $\leq \beta \leq$ VALUE B12max |
| | PATTERN P8 | KA$\geq$KB | UPPER RIGHT DIRECTION OPERATION | VALUE A13min $\leq \alpha \leq$ VALUE A13max | VALUE B13min $\leq \beta \leq$ VALUE S13max |
| | PATTERN P9 | KA<KB | UPPER LEFT DIRECTION OPERATION | VALUE A14min $\leq \alpha \leq$ VALUE A14max | VALUE B14min $\leq \beta \leq$ VALUE B14max |
| | PATTERN P9 | KA$\geq$KB | UPPER LEFT DIRECTION OPERATION | VALUE A15min $\leq \alpha \leq$ VALUE A15max | VALUE B15min $\leq \beta \leq$ VALUE B15max |
| | PATTERN P10 | ANY | UPPER DIRECTION OPERATION | VALUE A16mx $\leq \alpha \leq$ VALUE A16mx | VALUE B16min $\leq \beta \leq$ VALUE B16max |
| | PATTERN P11 | KA<KB | LEFT DIRECTION OPERATION | VALUE A17min $\leq \alpha \leq$ VALUE A17max | VALUE B17min $\leq \beta \leq$ VALUE B17max |
| | PATTERN P11 | KA$\geq$KB | UPPER LEFT DIRECTION OPERATION | VALUE A18min $\leq \alpha \leq$ VALUE A18max | VALUE B18min $\leq \beta \leq$ VALUE B18max |
| | PATTERN P12 | KA<KB | LEFT DIRECTION OPERATION | VALUE A19min $\leq \alpha \leq$ VALUE A19max | VALUE B19min $\leq \beta \leq$ VALUE B19max |
| | PATTERN P12 | KA$\geq$KB | LOWER LEFT DIRECTION OPERATION | VALUE A20min $\leq \alpha \leq$ VALUE A20max | VALUE B20min $\leq \beta \leq$ VALUE B20max |
| | PATTERN P13 | KA<KB | LEFT DIRECTION OPERATION | VALUE A21min $\leq \alpha \leq$ VALUE A21max | VALUE B21min $\leq \beta \leq$ VALUE B21max |
| | PATTERN P13 | KA$\geq$KB | UPPER LEFT DIRECTION OPERATION | VALUE A22min $\leq \alpha \leq$ VALUE A22max | VALUE B22min $\leq \beta \leq$ VALUE B22max |
| | PATTERN P14 | KA<KB | LEFT DIRECTION OPERATION | VALUE A23min $\leq \alpha \leq$ VALUE A23max | VALUE B23min $\leq \beta \leq$ VALUE B23max |
| | PATTERN P14 | KA$\geq$KB | LOWER LEFT DIRECTION OPERATION | VALUE A24min $\leq \alpha \leq$ VALUE A24max | VALUE B24min $\leq \beta \leq$ VALUE B24max |
| | PATTERN P15 | KA<KB | LOWER DIRECTION OPERATION | VALUE A25min $\leq \alpha \leq$ VALUE A25max | VALUE B25min $\leq \beta \leq$ VALUE B25max |
| | PATTERN P15 | KA$\geq$KB | LOWER RIGHT DIRECTION OPERATION | VALUE A26min $\leq \alpha \leq$ VALUE A26max | VALUE B26min $\leq \beta \leq$ VALUE B26max |
| | PATTERN P16 | ANY | LOWER DIRECTION OPERATION | VALUE A27min $\leq \alpha \leq$ VALUE A27max | VALUE B27min $\leq \beta \leq$ VALUE B27max |

| PATTERN | TIME DIFFERENCE COMPARISON INFORMATION | PREDETERMINED DIRECTION OPERATION | FIRST RATIO | SECOND RATIO |
|---|---|---|---|---|
| PATTERN P1 | KA<KB | LOWER DIRECTION OPERATION | VALUE C1min≦α≦VALUE C1max | VALUE D1min≦β≦VALUE D1max |
| PATTERN P1 | KA≧KB | LOWER RIGHT DIRECTION OPERATION | VALUE C2min≦α≦VALUE C2max | VALUE D2min≦β≦VALUE D2max |
| PATTERN P2 | ANY | LOWER DIRECTION OPERATION | VALUE C3min≦α≦VALUE C3max | VALUE D3min≦β≦VALUE D3max |
| PATTERN P3 | KA<KB | RIGHT DIRECTION OPERATION | VALUE C4min≦α≦VALUE C4max | VALUE D4min≦β≦VALUE D4max |
| PATTERN P3 | KA≧KB | LOWER RIGHT DIRECTION OPERATION | VALUE C5min≦α≦VALUE C5max | VALUE D5min≦β≦VALUE D5max |
| PATTERN P4 | ANY | RIGHT DIRECTION OPERATION | VALUE C6min≦α≦VALUE C6max | VALUE D6min≦β≦VALUE D6max |
| PATTERN P5 | KA<KB | RIGHT DIRECTION OPERATION | VALUE C7min≦α≦VALUE C7max | VALUE D7min≦β≦VALUE D7max |
| PATTERN P5 | KA≧KB | UPPER RIGHT DIRECTION OPERATION | VALUE C8min≦α≦VALUE C8max | VALUE D8min≦β≦VALUE D8max |
| PATTERN P6 | ANY | RIGHT DIRECTION OPERATION | VALUE C9min≦α≦VALUE C9max | VALUE D9min≦β≦VALUE D9max |
| PATTERN P7 | KA<KB | UPPER RIGHT DIRECTION OPERATION | VALUE C10min≦α≦VALUE C10max | VALUE D10min≦β≦VALUE D10max |
| PATTERN P7 | KA≧KB | UPPER DIRECTION OPERATION | VALUE C11min≦α≦VALUE C11max | VALUE D11min≦β≦VALUE D11max |
| PATTERN P8 | ANY | UPPER DIRECTION OPERATION | VALUE C12min≦α≦VALUE C12max | VALUE D12min≦β≦VALUE D12max |
| PATTERN P9 | KA<KB | UPPER RIGHT DIRECTION OPERATION | VALUE C13min≦α≦VALUE C13max | VALUE D13min≦β≦VALUE D13max |
| PATTERN P9 | KA≧KB | UPPER LEFT DIRECTION OPERATION | VALUE C14min≦α≦VALUE C14max | VALUE D14min≦β≦VALUE D14max |
| PATTERN P10 | ANY | UPPER DIRECTION OPERATION | VALUE C15min≦α≦VALUE C15max | VALUE D15min≦β≦VALUE D15max |
| PATTERN P11 | KA<KB | UPPER LEFT DIRECTION OPERATION | VALUE C16min≦α≦VALUE C16max | VALUE D16min≦β≦VALUE D16max |
| PATTERN P11 | KA≧KB | LEFT DIRECTION OPERATION | VALUE C17min≦α≦VALUE C17max | VALUE D17min≦β≦VALUE D17max |
| PATTERN P12 | ANY | LEFT DIRECTION OPERATION | VALUE C18min≦α≦VALUE C18max | VALUE D18min≦β≦VALUE D18max |
| PATTERN P13 | KA<KB | LEFT DIRECTION OPERATION | VALUE C19min≦α≦VALUE C19max | VALUE D19min≦β≦VALUE D19max |
| PATTERN P13 | KA≧KB | LOWER LEFT DIRECTION OPERATION | VALUE C20min≦α≦VALUE C20max | VALUE D20min≦β≦VALUE D20max |
| PATTERN P14 | ANY | LEFT DIRECTION OPERATION | VALUE C21min≦α≦VALUE C21max | VALUE D21min≦β≦VALUE D21max |
| PATTERN P13 | KA<KB | UPPER LEFT DIRECTION OPERATION | VALUE C22min≦α≦VALUE C22max | VALUE D22min≦β≦VALUE D22max |
| PATTERN P14 | KA≧KB | LEFT DIRECTION OPERATION | VALUE C23min≦α≦VALUE C23max | VALUE D23min≦β≦VALUE D23max |
| PATTERN P14 | ANY | UPPER LEFT DIRECTION OPERATION | VALUE C24min≦α≦VALUE C24max | VALUE D24min≦β≦VALUE D24max |
| PATTERN P15 | KA<KB | LOWER DIRECTION OPERATION | VALUE C25min≦α≦VALUE C25max | VALUE D25min≦β≦VALUE D25max |
| PATTERN P15 | KA≧KB | LOWER RIGHT DIRECTION OPERATION | VALUE C26min≦α≦VALUE C26max | VALUE D26min≦β≦VALUE D26max |
| PATTERN P16 | ANY | LOWER DIRECTION OPERATION | VALUE C27min≦α≦VALUE C27max | VALUE D27min≦β≦VALUE D27max |

TB2

(B)

| PATTERN | TIME DIFFERENCE COMPARISON INFORMATION | PREDETERMINED DIRECTION OPERATION | FIRST RATIO | SECOND RATIO |
|---|---|---|---|---|
| PATTERN P1 | KA<KB | LOWER DIRECTION OPERATION | VALUE E1min≦α≦VALUE E1max | VALUE F1min≦β≦VALUE F1max |
| PATTERN P1 | KA≧KB | LOWER RIGHT DIRECTION OPERATION | VALUE E2min≦α≦VALUE E2max | VALUE F2min≦β≦VALUE F2max |
| PATTERN P2 | ANY | LOWER DIRECTION OPERATION | VALUE E3min≦α≦VALUE E3max | VALUE F3min≦β≦VALUE F3max |
| PATTERN P3 | KA<KB | RIGHT DIRECTION OPERATION | VALUE E4min≦α≦VALUE E4max | VALUE F4min≦β≦VALUE F4max |
| PATTERN P3 | KA≧KB | LOWER RIGHT DIRECTION OPERATION | VALUE E5min≦α≦VALUE E5max | VALUE F5min≦β≦VALUE F5max |
| PATTERN P4 | ANY | RIGHT DIRECTION OPERATION | VALUE E6min≦α≦VALUE E6max | VALUE F6min≦β≦VALUE F6max |
| PATTERN P5 | KA<KB | RIGHT DIRECTION OPERATION | VALUE E7min≦α≦VALUE E7max | VALUE F7min≦β≦VALUE F7max |
| PATTERN P5 | KA≧KB | UPPER RIGHT DIRECTION OPERATION | VALUE E8min≦α≦VALUE E8max | VALUE F8min≦β≦VALUE F8max |
| PATTERN P6 | ANY | RIGHT DIRECTION OPERATION | VALUE E9min≦α≦VALUE E9max | VALUE F9min≦β≦VALUE F9max |
| PATTERN P7 | KA<KB | UPPER RIGHT DIRECTION OPERATION | VALUE E10min≦α≦VALUE E10max | VALUE F10min≦β≦VALUE F10max |
| PATTERN P7 | KA≧KB | UPPER DIRECTION OPERATION | VALUE E11min≦α≦VALUE E11max | VALUE F11min≦β≦VALUE F11max |
| PATTERN P8 | ANY | UPPER DIRECTION OPERATION | VALUE E12min≦α≦VALUE E12max | VALUE F12min≦β≦VALUE F12max |
| PATTERN P9 | KA<KB | UPPER RIGHT DIRECTION OPERATION | VALUE E13min≦α≦VALUE E13max | VALUE F13min≦β≦VALUE F13max |
| PATTERN P9 | KA≧KB | UPPER LEFT DIRECTION OPERATION | VALUE E14min≦α≦VALUE E14max | VALUE F14min≦β≦VALUE F14max |
| PATTERN P10 | ANY | UPPER DIRECTION OPERATION | VALUE E15min≦α≦VALUE E15max | VALUE F15min≦β≦VALUE F15max |
| PATTERN P11 | KA<KB | UPPER LEFT DIRECTION OPERATION | VALUE E16min≦α≦VALUE E16max | VALUE F16min≦β≦VALUE F16max |
| PATTERN P11 | KA≧KB | LEFT DIRECTION OPERATION | VALUE E17min≦α≦VALUE E17max | VALUE F17min≦β≦VALUE F17max |
| PATTERN P12 | ANY | LEFT DIRECTION OPERATION | VALUE E18min≦α≦VALUE E18max | VALUE F18min≦β≦VALUE F18max |
| PATTERN P13 | KA<KB | LEFT DIRECTION OPERATION | VALUE E19min≦α≦VALUE E19max | VALUE F19min≦β≦VALUE F19max |
| PATTERN P13 | KA≧KB | LOWER LEFT DIRECTION OPERATION | VALUE E20min≦α≦VALUE E20max | VALUE F20min≦β≦VALUE F20max |
| PATTERN P14 | ANY | LEFT DIRECTION OPERATION | VALUE E21min≦α≦VALUE E21max | VALUE F21min≦β≦VALUE F21max |
| PATTERN P13 | KA<KB | UPPER LEFT DIRECTION OPERATION | VALUE E22min≦α≦VALUE E22max | VALUE F22min≦β≦VALUE F22max |
| PATTERN P14 | KA≧KB | LEFT DIRECTION OPERATION | VALUE E23min≦α≦VALUE E23max | VALUE F23min≦β≦VALUE F23max |
| PATTERN P14 | ANY | UPPER LEFT DIRECTION OPERATION | VALUE E24min≦α≦VALUE E24max | VALUE F24min≦β≦VALUE F24max |
| PATTERN P15 | KA<KB | LOWER DIRECTION OPERATION | VALUE E25min≦α≦VALUE E25max | VALUE F25min≦β≦VALUE F25max |
| PATTERN P15 | KA≧KB | LOWER RIGHT DIRECTION OPERATION | VALUE E26min≦α≦VALUE E26max | VALUE F26min≦β≦VALUE F26max |
| PATTERN P16 | ANY | LOWER DIRECTION OPERATION | VALUE E27min≦α≦VALUE E27max | VALUE F27min≦β≦VALUE F27max |

TB3

FIG.14
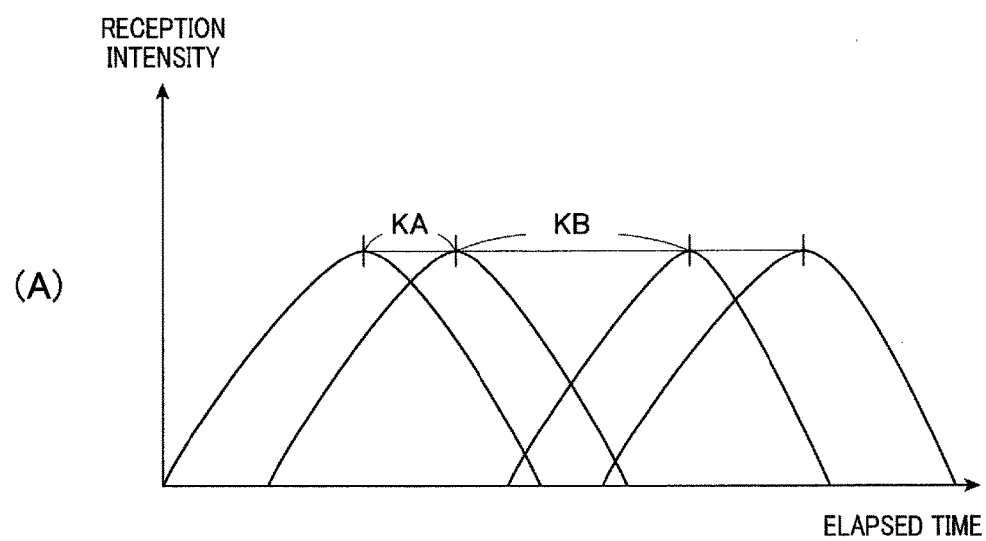
(A)
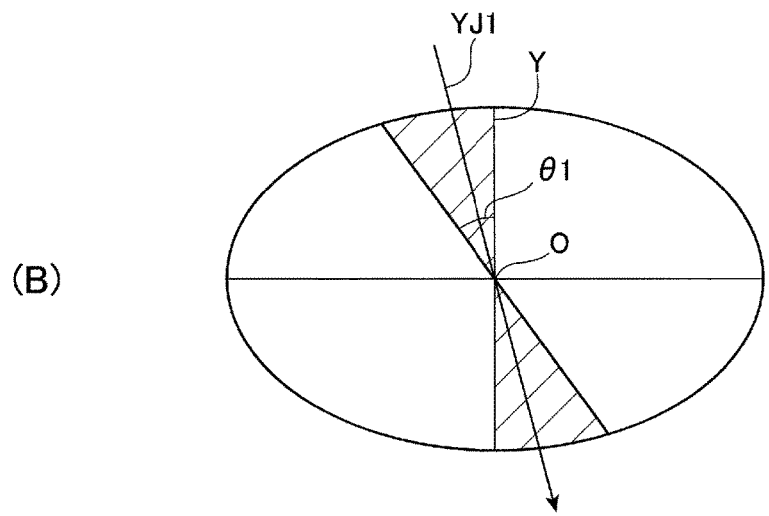
(B)

FIG.15
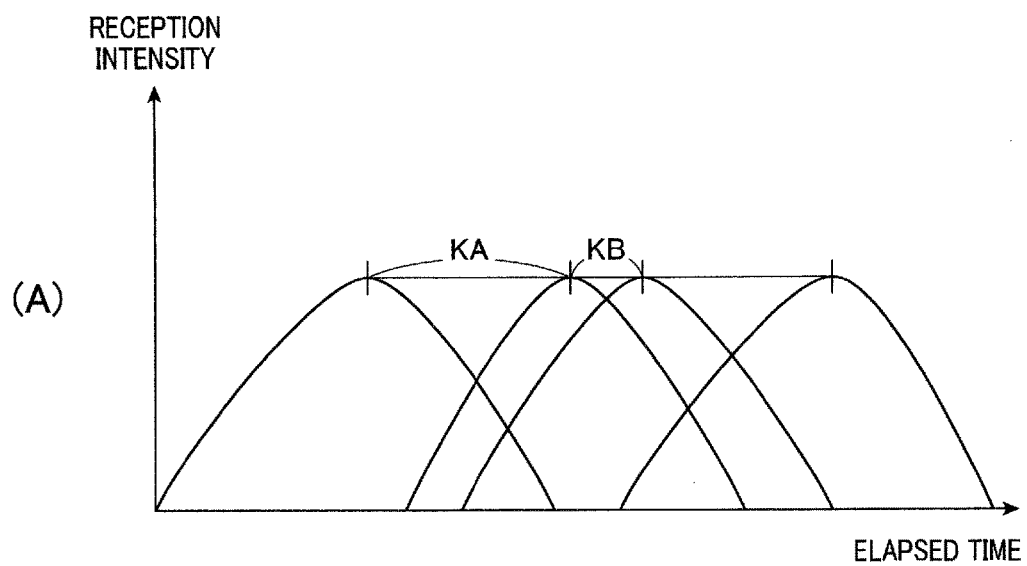
(A)
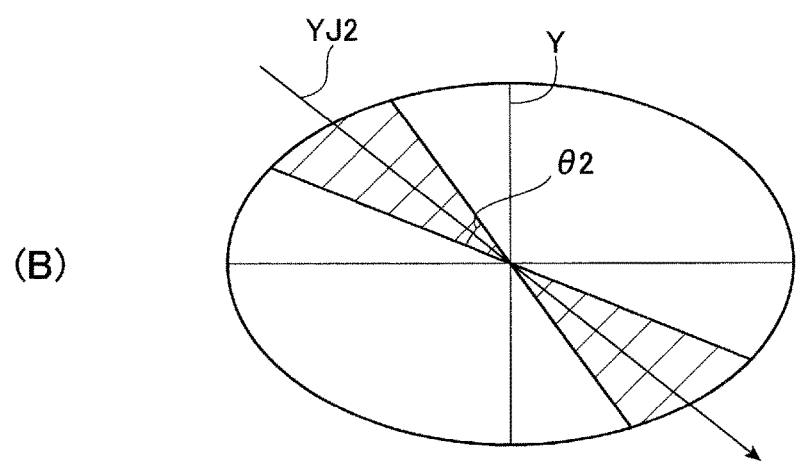
(B)

FIG.16
(A)
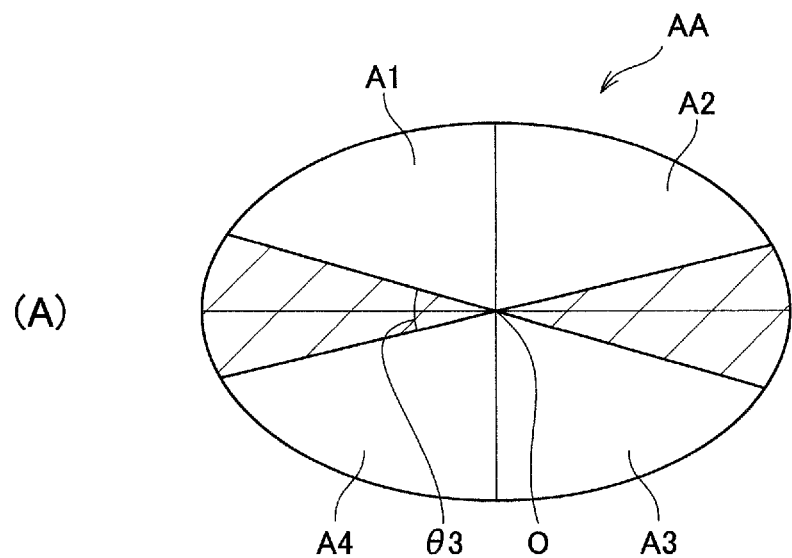
(B)
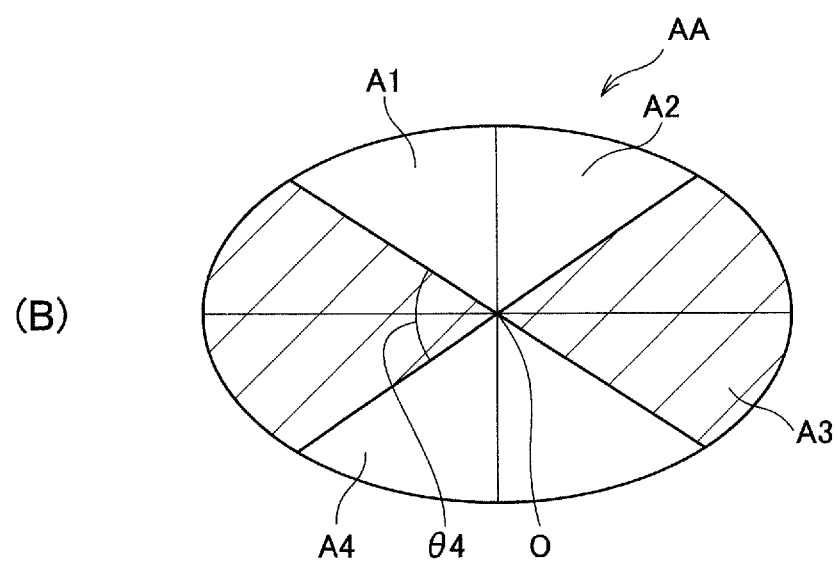

NON-CONTACT OPERATION DETECTION DEVICE

TECHNICAL FIELD

The present invention relates to a non-contact operation detection device.

BACKGROUND ART

The background art of the technical field of the present invention is described in Japanese Patent Laid-Open No. 2013-195326 (Patent Literature 1). Patent Literature 1 recites "the object detection device includes regions for detecting the spatial position of a hand, and comprises: a first light-emitting section 1A, a second light-emitting section 1A2, and a light-receiving section 1B that are arranged such that, when, in one of the regions which correspond to the hand, the distance with respect to the hand is equal to or less than a threshold distance, it is detected that the hand is in the region; and a sensor driver 10 configured such that, when detecting the hand is in the region A and the region B, sets the threshold distance for the region C to a threshold distance corresponding to predetermined wipe operation of the hand".

CITATION LIST

Patent Literature

Patent Literature 1: Japanese Patent Laid-Open No. 2013-195326

SUMMARY OF INVENTION

Technical Problem

According to Patent Literature 1, it is possible to prevent the user being forced to perform an unnatural movement of the hand. However, in this case, there is a need to improve the operability for the user.

The present invention has been made in view of the above-described circumstance. It is an object of the present invention to provide a non-contact operation detection device which improves the user's convenience.

Solution to Problem

In order to achieve the above described object, a vehicle-mounted non-contact operation detection device includes a control section that is configured to detect non-contact operation, and is configured such that, in a first mode, whether or not the non-contact operation is an effective operation is determined on the basis of a first rule, and in a second mode, whether or not the non-contact operation is an effective operation is determined on the basis of a second rule.

Advantageous Effects of Invention

The present invention relates to the non-contact operation and improves the convenience of the user.

BRIEF DESCRIPTION OF DRAWINGS

FIG. 7 is a view showing an example of screens displayed by the on-vehicle device.

FIG. 11 is a view showing peak order patterns.

FIG. 12 is a view showing a first table stored by the on-vehicle device.

FIG. 13 is a view showing second and third tables stored by the on-vehicle device.

FIG. 14 is a view used for explaining the recognition range of lower direction operation.

FIG. 15 is a view used for explaining the recognition range of lower right direction operation.

FIG. 16 is a view used for explaining the difference between the recognition range of predetermined operation in the first mode and the recognition range of the predetermined operation in the third mode.

DESCRIPTION OF EMBODIMENTS

Figure 1:
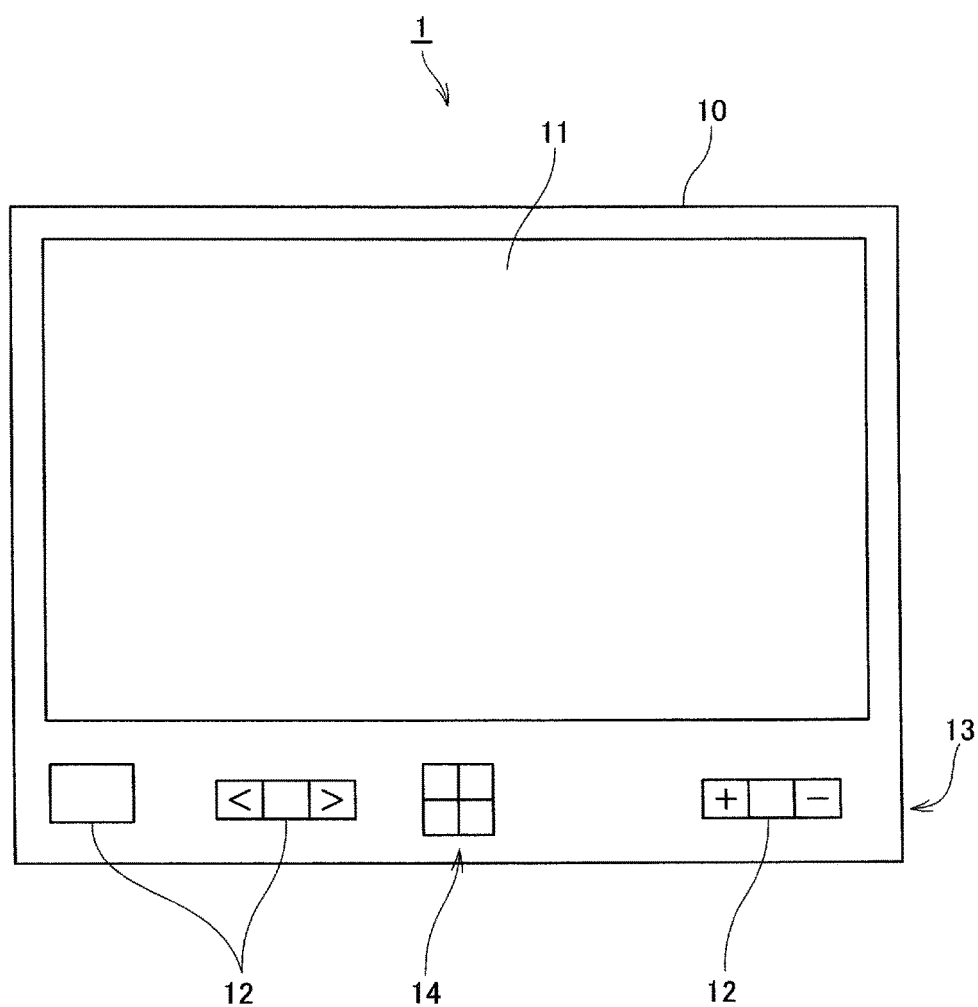
FIG. 1 is a front view of an on-vehicle device according to a present embodiment.

FIG. 1 is a view when an on-vehicle device 1 (non-contact operation detection device) according to an embodiment is viewed from the front thereof.

As shown in FIG. 1, the on-vehicle device 1 includes a control board, an interface board, and a casing 10 housing therein a power supply section, and the like. On the front of the casing 10, a touch panel 11 (display section) is provided. On the front of the casing 10, an operation panel 13 provided with a plurality of operation switches 12, such as a power supply switch, is provided in the lower portion of the touch panel 11. An infrared sensor unit 14 is provided at the left-right direction central portion of the operation panel 13. The infrared sensor unit 14 will be described below.

The on-vehicle device 1 is provided in the dashboard of the vehicle. As described below, in front of the on-vehicle device 1, a user performs non-contact operation and input to the on-vehicle device 1. The non-contact operation is not an operation performed by touching the on-vehicle device 1 (operation by touching the touch panel 11, operation by depressing the operation switch 12, and the like), but means operation performed by the user's hand being moved in a predetermined manner in a predetermined region in front of the on-vehicle device 1. When the non-contact operation is performed, the user's sight line direction does not need to be moved to the on-vehicle device 1. Therefore, even during driving the vehicle, the user can perform various types of input to the on-vehicle device 1 by performing the non-contact operation.

Figure 2:
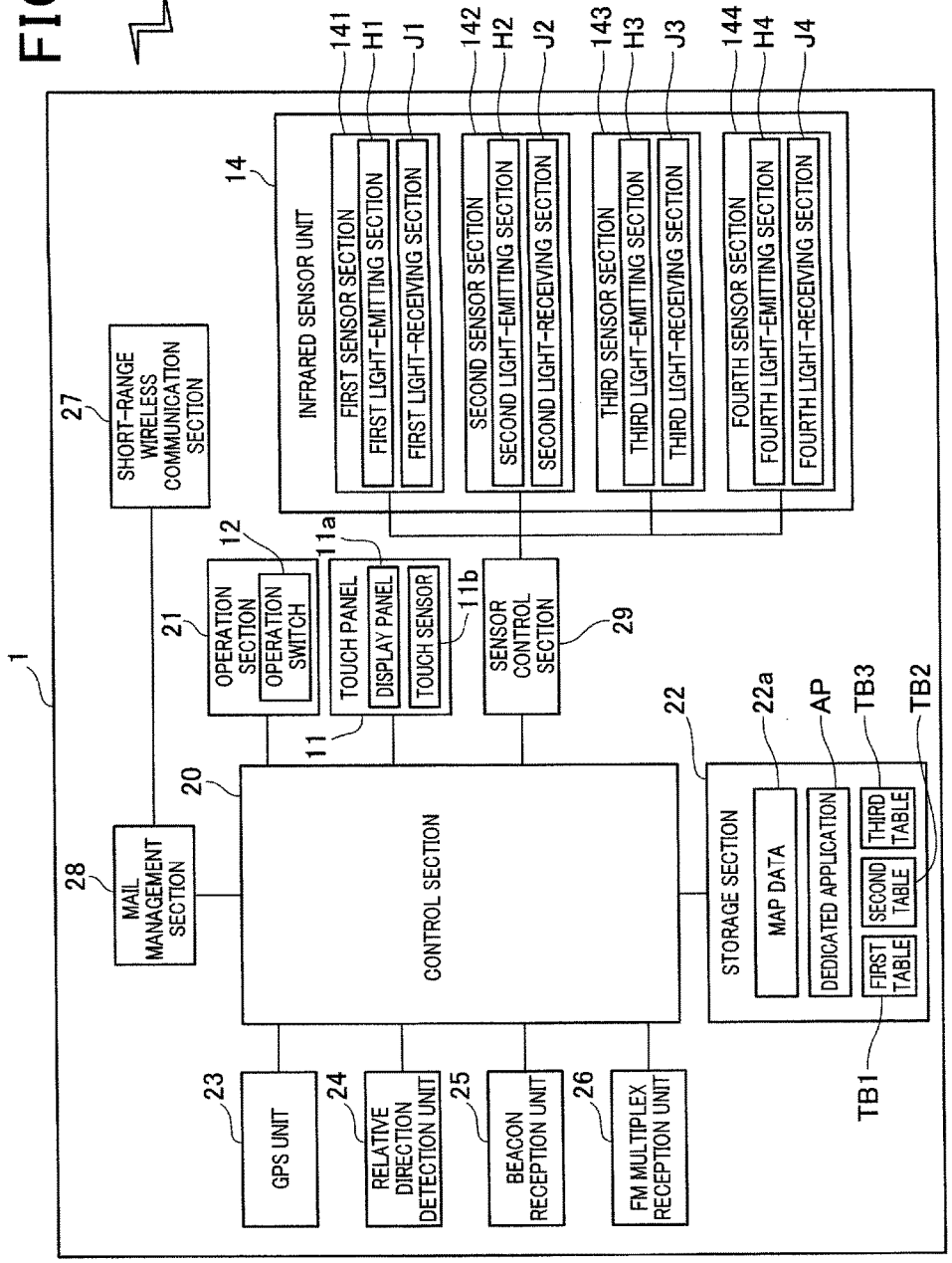
FIG. 2 is a block diagram showing a functional configuration of the on-vehicle device.

FIG. 2 is a block diagram showing a functional configuration of the on-vehicle device 1.

As shown in FIG. 2, the on-vehicle device 1 includes a control section 20, the touch panel 11, an operation section 21, a storage section 22, a GPS unit 23, a relative direction detection unit 24, a beacon reception unit 25, an FM multiplex reception unit 26, a short-range wireless communication section 27, a mail management section 28, a sensor control section 29, and an infrared sensor unit 14.

The control section 20 includes CPU, ROM, RAM, other peripheral circuits, and the like, and controls each of the sections of the on-vehicle device 1.

The touch panel 11 includes a display panel 11a, and a touch sensor 11b. The display panel 11a is configured by a liquid crystal display panel, or the like, and displays various images by control of the control section 20. The touch sensor 11b is arranged to overlap the display panel 11a, and detects the touch operation of the user, to output the detection data to the control section 20.

The operation section 21 includes the operation switch 12, and detects operation of the operation switch 12, to output the detection data to the control section 20.

The storage section 22 includes a nonvolatile memory, and stores various data. The storage section 22 stores map data 22a and application AP. The application AP will be described below. The map data 22a are data which include information about a map, information about facilities existing on the map, information on links representing roads on the map, information on nodes representing connection portions of the links, and the like, and which include information required to display the map on the display panel 11a, information required to perform route guidance (described below), and the like.

The GPS unit 23 receives GPS radio waves from a GPS satellite via a GPS antenna (not shown), and acquires, by calculation, the present position and traveling direction of the vehicle from GPS signals superimposed on the GPS radio waves. The GPS unit 23 outputs the acquisition results to the control section 20.

The relative direction detection unit 24 includes a gyro sensor 71, and an acceleration sensor 72. The gyro sensor 71 is configured by using, for example, a vibrating gyroscope, and detects the relative direction (for example, the amount of rotation in the yaw axis direction) of the vehicle. The acceleration sensor 72 detects acceleration acting on the vehicle (for example, inclination of the vehicle with respect to the traveling direction). The relative direction detection unit 24 outputs the detection results to the control section 20.

The control section 20 has a function of estimating the present position of the vehicle on the basis of the input from the GPS unit 23 and the relative direction detection unit 24, and on the basis of the map data 22a, and has a function of displaying the estimated present position on the map displayed on the display panel 11a. Further, the control section 20 has a function of displaying the route to the destination and guiding the route while displaying the present position of the vehicle on the map.

The beacon reception unit 25 is configured to receive radio waves related to road traffic information emitted by a radio wave beacon or an optical beacon (hereinafter referred to simply as a "beacon") provided on the road on which the vehicle travels, and is configured to generate road traffic information on the basis of the received radio waves, and outputs the generated road traffic information to the control section 20. The road traffic information is VICS (Vehicle Information and Communication System: registered trademark) information, and includes information on traffic congestion, road traffic regulation, and the like.

The FM multiplex reception unit 26 receives FM multiplex broadcast waves, and extracts road traffic information to output the extracted information to the control section 20.

In more detail, the FM multiplex reception unit 26 includes an FM multiplex dedicated tuner, and a multiplex encoder. The FM multiplex dedicated tuner receives the FM multiplex broadcasting and outputs FM multiple signals to the multiplex encoder. The multiplex encoder decodes the FM multiple signals inputted from the FM multiplex dedicated tuner, and thereby acquires road traffic information to output the road traffic information to the control section 20.

According to the communication standard of short-range wireless communication, such as Bluetooth (registered trademark), and the like, the short-range wireless communication section 27 establishes a wireless communication link with a portable terminal KT owned by the user present in the vehicle, and performs wireless communication with the portable terminal KT.

The portable terminal KT is a mobile terminal, such as a mobile phone, and a tablet terminal, and has the function of accessing the internet via a telephone line or a wireless LAN. The portable terminal KT has the function of receiving mail about SMS, and mail, such as Web mail, from a predetermined server. It should be noted that, in the present embodiment, the portable terminal KT receives mail and transmits the data of the mail to the on-vehicle device 1. However, for example, the portable terminal KT may also be configured to receive a notification, such as a Web message and a push notification, by the function of predetermined application, such as a chat application, messenger application, application supplied by a predetermined service provider, each of which application is installed in the portable terminal KT, and configured to transmit the data according to the received notification to the on-vehicle device 1. Further, the portable terminal KT has functions of, by pre-installed software, responding to inquiry from the mail management section 28 (described below), and transmitting mail data newly received in response to request from the mail management section 28.

The mail management section 28 performs communication with the portable terminal KT by controlling the short-range wireless communication section 27, and inquires, to the portable terminal KT, whether or not the portable terminal KT has newly received mail. When there is a response corresponding to the inquiry and indicating the reception of new mail, the mail management section 28 requests the portable terminal KT to transmit the data of the new mail, and receives the data to store the data in a predetermined storage region.

The sensor control section 29 controls the infrared sensor unit 14 according to the control of the control section 20. The infrared sensor unit 14 is a sensor unit which, by using infrared rays, detects non-contact operation performed by the user, and includes a first sensor section 141 (first sensor), a second sensor section 142 (second sensor), a third sensor section 143 (third sensor), and a fourth sensor section 144 (fourth sensor). The first sensor section 141 includes a first light-emitting section H1 and a first light-receiving section J1, and the second sensor section 142 includes a second light-emitting section H2 and a second light-receiving section J2. The third sensor section 143 includes a third light-emitting section H3 and a third light-receiving section J3, and the fourth sensor section 144 includes a fourth light-emitting section H4 and a fourth light-receiving section J4. In the following, a detailed configuration of the infrared sensor unit 14, and types of non-contact operation performed by the user will be described.

It should be noted that the infrared sensor unit 14 according to the present embodiment includes the four sensor sections, each of which is configured to include an infraredray light-emitting section, and a reflected light-receiving section. However, the configuration of the infrared sensor unit 14 is not limited to this, and may be, for example, a form in which a light-emitting section and light-receiving section are provided, and in which the light receiving surface of the light-receiving section is divided into four surfaces. That is, the configuration of the infrared sensor unit 14 may be a configuration which can recognize the non-contact operation described below. The number of the sensor sections, the modes of the light-emitting section and the light-receiving section in the sensor section, and the relationship among the sensor section and the light-emitting section and the light-receiving section are not limited to the configuration according to the present embodiment.

Figure 3:
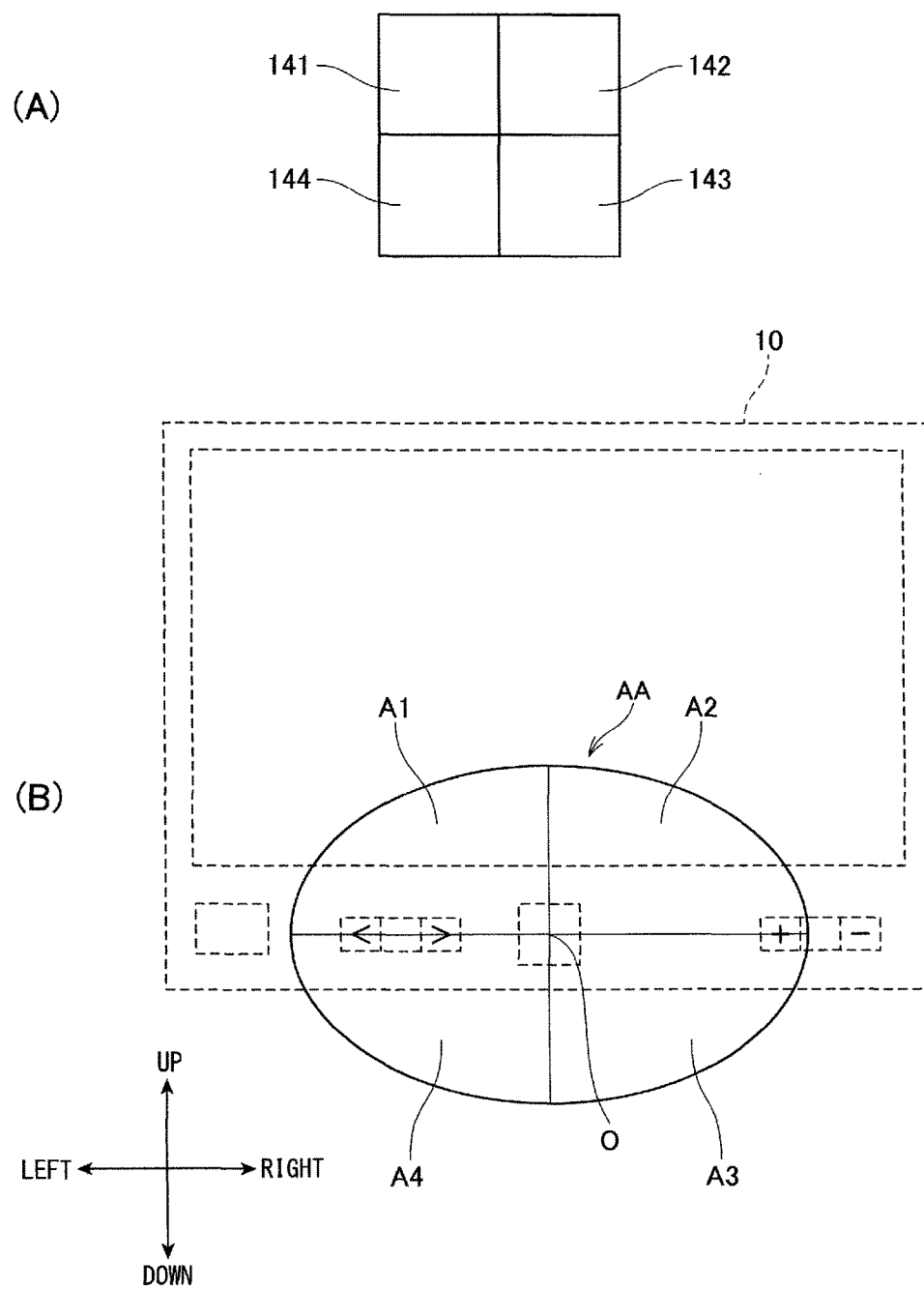
FIG. 3(A) is a view showing an arrangement state of four sensor sections.
FIG. 3(B) is a view showing a detection range of an infrared sensor unit.

FIG. 3(A) is a view schematically showing an arrangement state when the sensor sections of the infrared sensor unit 14 are respectively viewed from the front of the infrared sensor unit 14. FIG. 3(B) is a front view of the on-vehicle device 1, which view is shown by dotted lines, and is a view schematically showing a mode which is suitable for describing the detection range AA of the user's hand by the infrared sensor unit 14 formed in front of the on-vehicle device 1.

In the following description, as indicated by the arrows in FIG. 3(B), when the on-vehicle device 1 is viewed from the front, the direction toward the top is set as the upper direction, the direction toward the bottom is set as the lower direction, the direction toward the left side is set as the left direction, and the direction toward the right side is set as the right direction. Further, in the depth direction perpendicular to the vertical direction, the direction toward the front is set as the forward direction, and the direction opposite to the forward direction is set as the backward direction.

As shown in FIG. 3(A), in the infrared sensor unit 14, the second sensor section 142 is provided on the right side of the first sensor section 141, the third sensor section 143 is provided under the second sensor section 142, the fourth sensor section 144 is provided on the left side of the third sensor section 143, and the first sensor section 141 is provided above the fourth sensor section 144.

As described above, the first sensor section 141 includes the first light-emitting section H1 and the first light-receiving section J1. The first light-emitting section H1 of the first sensor section 141 emits an infrared ray at a predetermined period according to the control of the sensor control section 29. The first light-receiving section J1 receives the reflected light of the infrared ray emitted by the first light-emitting section H1, and outputs, to the sensor control section 29, the signal indicating the intensity of the received light. The sensor control section 29 A/D-converts the signal indicating the intensity of the inputted received light, and thereby generates data (hereinafter referred to as "first received light intensity data") indicating the received light intensity as a gradation value of a predetermined gradation, to output the generated data to the control section 20. As a result, the first received light intensity data are outputted from the sensor control section 29 to the control section 20 at the predetermined period.

In FIG. 3(B), the first detection range A1 schematically shows the range of detection of the user's hand (detection object) by the first sensor section 141. That is, when the user's hand is located in the first detection range A1, the first light-receiving section J1 can receive the reflected light of the infrared ray which is emitted by the first light-emitting section H1 and reflected by the user's hand. As the user's hand is closer to the first sensor section 141 in the first detection range A1, the value of the received light intensity is increased, which light intensity is represented by the first received light intensity data generated on the basis of the light that is reflected by the user's hand and received by the first light-receiving section J1.

It should be noted that, for the convenience of description, the first detection range A1 in FIG. 3(B) is a rough indication of the detection range of the user's hand by the first sensor section 141, and does not indicate the precise detection range. In practice, the first detection range A1 overlaps with the third detection range A3 to the fourth detection range A4. FIG. 3(B) also shows a state where the first detection range A1 is formed in such a manner that the range, in which the user's hand is detected by the first sensor section 141, is cut along the front surface 10a of the on-vehicle device 1 at a predetermined position. However, the first detection range A1 extends in the back-and-forth direction (depth direction) according to the features of the first sensor section 141. Such feature of the first detection range A1 in FIG. 3(B) is the same as that of each of the second detection range A2 to the fourth detection range A4.

In FIG. 3(B), the second detection range A2 schematically shows the detection range of the user's hand by the second sensor section 142. That is, when the user's hand is located in the second detection range A2, the second light-receiving section J2 can receive the reflected light of the infrared ray which is emitted by the second light-emitting section H2 and reflected by the user's hand. The second light-emitting section H2 of the second sensor section 142 emits an infrared ray at the predetermined period according to the control of the sensor control section 29. The second light-receiving section J2 receives the reflected light of the infrared ray emitted by the second light-emitting section H2, and outputs, to the sensor control section 29, the signal indicating the intensity of the received reflected light. The sensor control section 29 A/D-converts the signal indicating the intensity of the inputted received light, and thereby generates data (hereinafter referred to as "second received light intensity data") indicating the received light intensity as a gradation value of a predetermined gradation, to output the generated data to the control section 20. As a result, the second received light intensity data are outputted from the sensor control section 29 to the control section 20 at the predetermined period.

In FIG. 3(B), the third detection range A3 schematically shows the detection range of the user's hand by the third sensor section 143. That is, when the user's hand is located in the third detection range A3, the third light-receiving section J3 can receive the reflected light of the infrared ray which is emitted by the third light-emitting section H3 and reflected by the user's hand. The third light-emitting section H3 of the third sensor section 143 emits an infrared ray at the predetermined period according to the control of the sensor control section 29. The third light-receiving section J3 receives the reflected light of the infrared ray emitted by the third light-emitting section H3, and outputs, to the sensor control section 29, the signal indicating the intensity of the received reflected light. The sensor control section 29 A/D-converts the signal indicating the intensity of the inputted received light, and thereby generates data (hereinafter referred to as "third received light intensity data") indicating the received light intensity as a gradation value of a predetermined gradation, to output the generated data to the control section 20. As a result, the third received light intensity data are outputted from the sensor control section 29 to the control section 20 at the predetermined period.

In FIG. 3(B), the fourth detection range A4 schematically shows the detection range of the user's hand by the fourth sensor section 144. That is, when the user's hand is located in the fourth detection range A4, the fourth light-receiving section J4 can receive the reflected light of the infrared ray which is emitted by the fourth light-emitting section H4 and reflected by the user's hand. The fourth light-emitting section H4 of the fourth sensor section 144 emits an infrared ray at the predetermined period according to the control of the sensor control section 29. The fourth light-receiving section J4 receives the reflected light of the infrared ray emitted by the fourth light-emitting section H4, and outputs, to the sensor control section 29, the signal indicating the intensity of the received reflected light. The sensor control section 29 A/D-converts the signal indicating the intensity of the inputted received light, and thereby generates data (hereinafter referred to as "fourth received light intensity data") indicating the received light intensity as a gradation value of a predetermined gradation, to output the generated data to the control section 20. As a result, the fourth received light intensity data are outputted from the sensor control section 29 to the control section 20 at the predetermined period.

In the following, when the first received light intensity data to the fourth received light intensity data are represented without distinction, each of the first received light intensity data to the fourth received light intensity data is represented as "received light intensity data".

As shown in FIG. 3(B), the detection range AA is a detection range configured by the first detection range A1 to the fourth detection range A4.

By the method described below, and on the basis of the inputted received light intensity data of the first received light intensity data to the fourth received light intensity data, the control section 20 detects non-contact operation performed by the user. Further, by the method described below, the control section 20 analyzes the non-contact operation, and recognizes the non-contact operation performed by the user, to determine whether or not the non-contact operation is effective. Specifically, "recognizing the non-contact operation" means identifying the type of non-contact operation performed by the user. In the present embodiment, as the types of non-contact operation, there are eight types of operation, lower direction operation, upper direction operation, right direction operation, left direction operation, lower right direction operation, upper right direction operation, upper left direction operation, and lower left direction operation. In the following, when the eight types of non-contact operation are represented without distinction, each of the eight types of non-contact operation is represented as "predetermined direction operation".

FIG. 4(A) to FIG. 4(H) respectively show lower direction operation, upper direction operation, right direction operation, left direction operation, lower right direction operation, upper right direction operation, upper left direction operation, and lower left direction operation.

Figure 4:
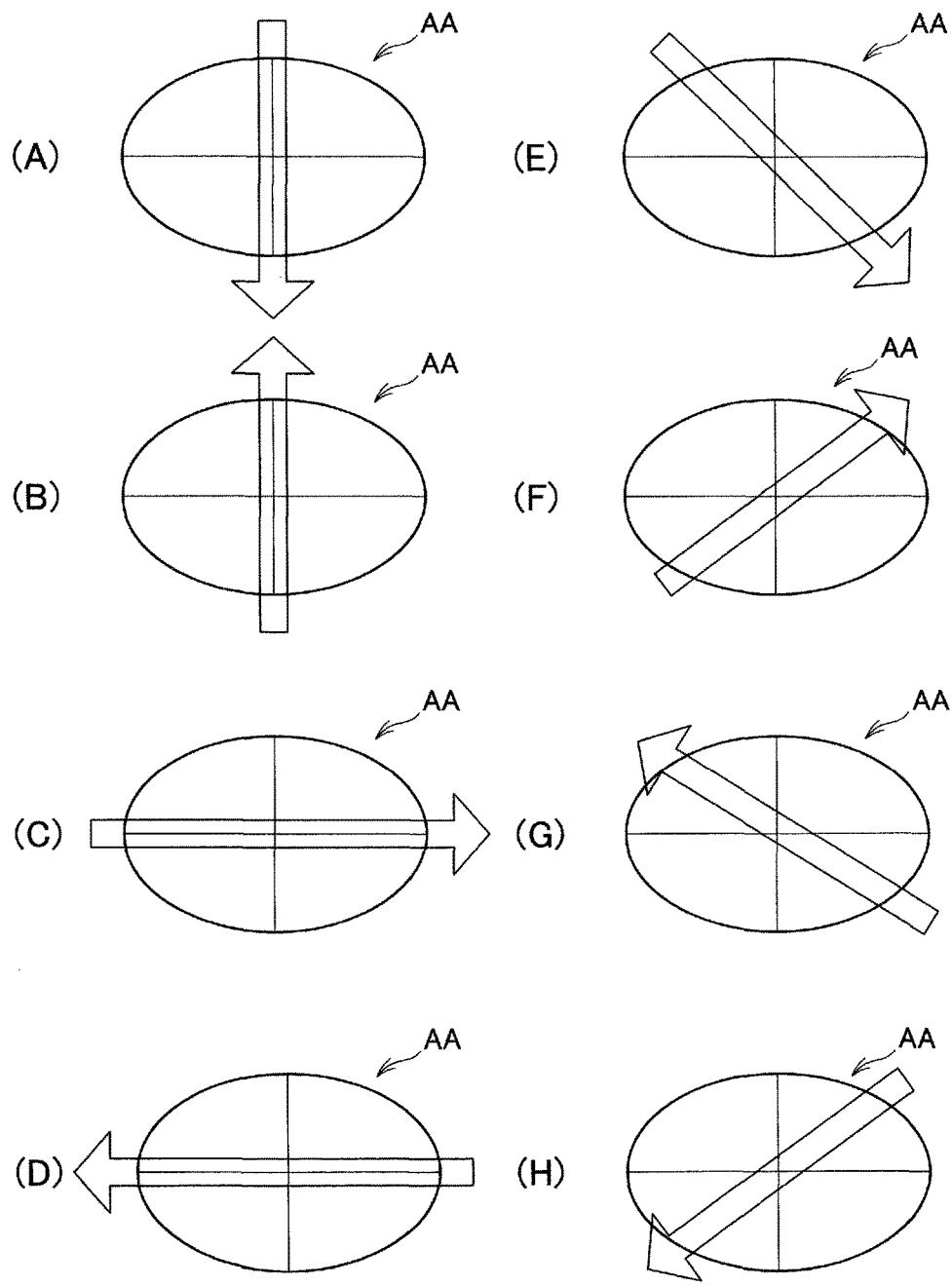
FIG. 4 is a view showing predetermined direction operation.

The lower direction operation means operation of the user's hand when the user's hand passes through the detection range AA in the lower direction. In FIG. 4(A), in order to explain the lower direction operation, an example of movement of the user's hand at the time of lower direction operation is shown by the arrow in relation to the detection range AA. As shown in FIG. 4(A), in the lower direction operation, the user's hand enters the detection range AA from the upper side of the detection range AA, and then moves downward in the detection range AA. Then, the user's hand exits downward from the detection range AA.

As shown in FIG. 4(B), the upper direction operation means operation of the user's hand when the user's hand passes through the detection range AA in the upper direction. As shown in FIG. 4(C), the right direction operation means operation of the user's hand when the user's hand passes through the detection range AA in the right direction. As shown in FIG. 4(D), the left direction operation means operation of the user's hand when the user's hand passes through the detection range AA in the left direction.

As shown in FIG. 4(E), the lower right direction operation means operation of the user's hand when the user's hand passes through the detection range AA in the lower right direction. As shown in FIG. 4(F), the upper right direction operation means operation of the user's hand when the user's hand passes through the detection range AA in the upper right direction. As shown in FIG. 4(G), the upper left direction operation means operation of the user's hand when the user's hand passes through the detection range AA in the upper left direction. As shown in FIG. 4(H), the lower left direction operation means operation of the user's hand when the user's hand passes through the detection range AA in the lower left direction.

It should be noted that each predetermined direction operation is based on the assumption that the user's hand moves linearly in the detection range AA and passes near the center O (see FIG. 3(B)) of the detection range AA. When the input by the non-contact operation is performed, the user is notified in advance that the hand is to be moved in the above-described manner. When, by the method described below, the detected non-contact operation is determined not to be the operation in which the user's hand moves linearly in the detection range AA and passes near the center O (see FIG. 3(B)) of the detection range AA, the control section 20 does not specify the type of the predetermined direction operation according to the non-contact operation performed by the user, and hence, does not perform the processing based on the non-contact operation. Thereby, even when the non-contact operation contrary to the intention of the user is detected, it is suppressed that the processing based on the non-contact operation is performed. The case where the non-contact operation contrary to the intention of the user is detected means a case where the user inserts its hand into the detection range AA, and the insertion operation is detected by the infrared sensor unit 14 when the user is not intended to perform the non-contact operation, such as, when the user tries to operate the operation switch 12 of the on-vehicle device 1, or when the user tries to take an object on the dashboard.

Next, the operation of the on-vehicle device 1, when the user performs non-contact operation, will be described with reference to specific examples.

The on-vehicle device 1 can display, on the touch panel 11, a plurality of types of screens having different display contents. Also, in the present embodiment, whether or not the input by non-contact operation is accepted is set for each of the types of the screens, and further, which of the first mode to the third mode is to be operated is set for each of the screens which is set so that the input by non-contact operation is accepted.

The first mode to the third mode are different from each other in the types of predetermined direction operation which are enabled among the eight types of predetermined direction operation. Specifically, in the first mode, the lower direction operation, the upper direction operation, the right direction operation, and the left direction operation are enabled. In the first mode, the regulation, which enables the non-contact operation according to the movements of the hand in up, down, left, and right four directions, corresponds to a "first rule". In the second mode, all eight types of the predetermined direction operation are enabled. That is, in the second mode, the non-contact operation, in which the user's hand is moved in an arbitrary direction, is enabled. In the second mode, the regulation, which enables the non-contact operation according to the movement of the hand in an arbitrary direction, corresponds to a "second rule". In the third mode, the right direction operation and the left direction operation are enabled. In the third mode, the regulation, which enables the non-contact operation according to the movements of the hand in the two left and right directions, corresponds to a "third rule".

It should be noted that, as described below, the first mode to the third mode are different from each other in the range of the movement of the user's hand, which movement is recognized as the predetermined direction operation.

Figure 5:
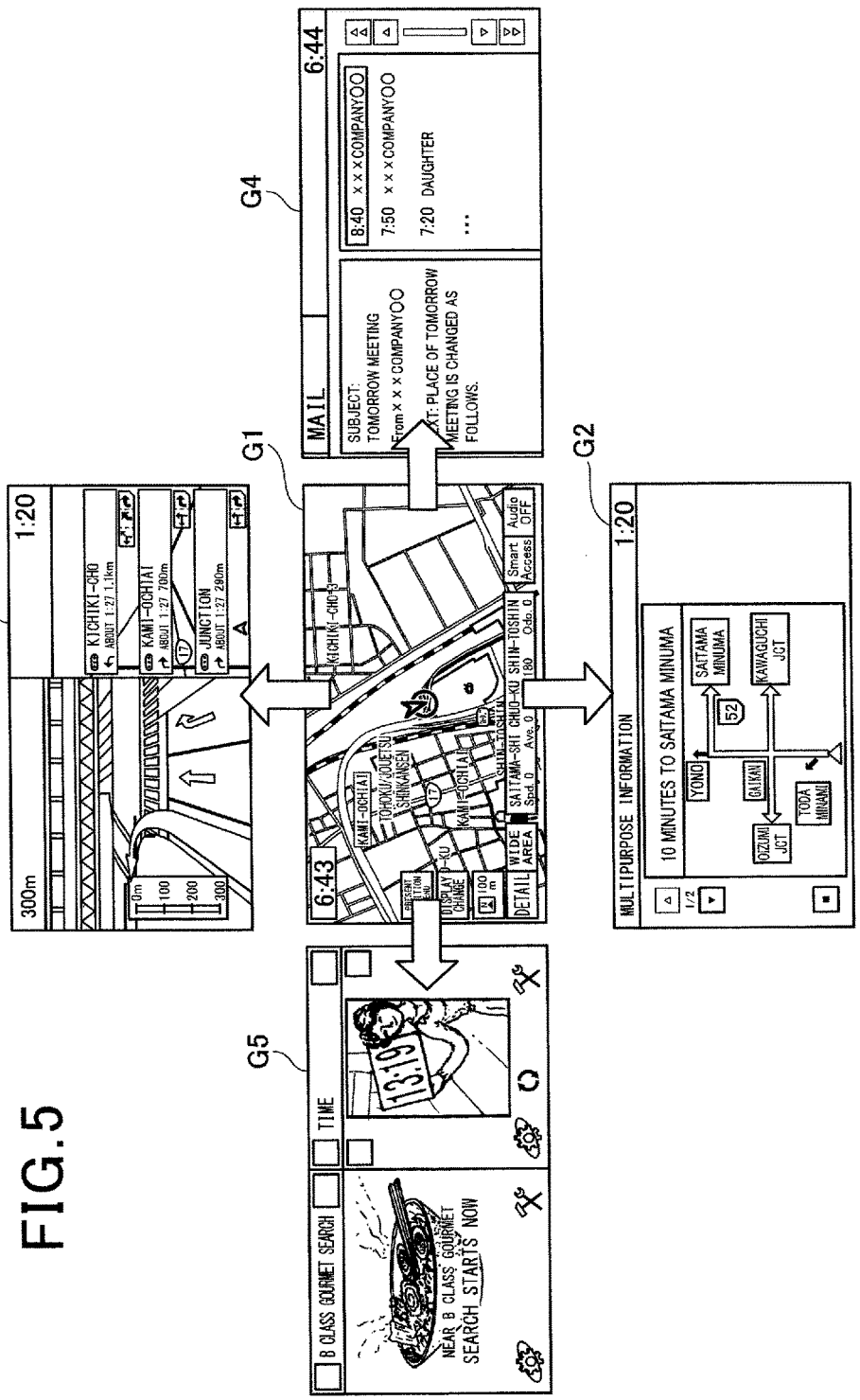
FIG. 5 is a view showing an example of screens and the transition of the screens displayed by the on-vehicle device.

FIG. 5 is a view used for explaining the operation of the on-vehicle device 1 when the non-contact operation is performed by the user.

In FIG. 5, the screen G1 is a screen to guide the route to the destination. On the screen G1, a map is displayed, and the present position of the vehicle and the route to the destination are displayed on the map.

On the screen G1, the first mode is set as the operation mode. That is, the lower direction operation, the upper direction operation, the right direction operation, and the left direction operation are enabled as the non-contact operation. Therefore, when the screen G1 is displayed, the user can perform each of the four types of non-contact operation of the lower direction operation, the upper direction operation, the right direction operation, and the left direction operation, to make the control section 20 perform the processing corresponding to the operation.

When, during the display of the screen G1, the control section 20 detects the lower direction operation, the screen displayed on the touch panel 11 is shifted from the screen G1 to the screen G2. The screen G2 is a screen which displays road traffic information. When the screen G2 is displayed, the control section 20 stores latest road traffic information received by the beacon reception unit 25 and the FM multiplex reception unit 26, and displays the latest road traffic information on the screen G2 in a predetermined manner.

On the screen G2, the second mode is set as the operation mode. Therefore, during the display of the screen G2, the user can perform moving operation of the hand in an arbitrary direction, to make the control section 20 perform the processing corresponding to the operation. When, during the display of the screen G2, the control section 20 detects the operation in which the user's hand is moved in an arbitrary direction operation, the screen displayed on the touch panel 11 is shifted from the screen G2 to the screen G1.

Because of this configuration, when the user wants to acquire the latest road traffic information while driving to the destination on the basis of the route provided on the screen G1, the user may perform the lower direction operation while continuing the driving. Further, when the user acquires the road traffic information provided on the screen G2 and wants to again display the screen G1 on the touch panel 11, the user may perform the non-contact operation by moving the hand in an arbitrary direction, while continuing the driving. In this way, the user can simply perform the screen shift operation between the screen G1 and the screen G2 by performing the non-contact operation. Especially, the shift operation from the screen G2 to the screen G1 is very simply performed because it is only required that the user moves the hand in an arbitrary direction.

Further, when, during the display of the screen G1, the control section 20 detects that the upper direction operation is to be performed, the control section 20 shifts the screen displayed on the touch panel 11 from the screen G1 to the screen G3. In the screen G3, among the intersections through which the vehicle is to pass in the route to the destination, a three-dimensional view of the intersection nearest to the present position of the vehicle is displayed in the substantially left half of the screen G3. Also, in the case where the vehicle travels on the route to the destination, information about three intersections, through which the vehicle passes to reach the destination in the shortest time, is displayed in the substantially right half of the screen G3. The information about the intersections includes intersections names, estimated reaching time to each of the intersections, the distance between each of the intersections and the present position of the vehicle, and the shape of each of the intersections. The control section 20 obtains necessary information from the map data 22a, and displays the screen G3 on the basis of the obtained information.

On the screen G3, the second mode is set as the operation mode. Therefore, during the display of the screen G3, the user can perform operation to move the hand in an arbitrary direction, and can make the control section 20 perform the processing corresponding to the operation. When, during the display of the screen G3, the control section 20 detects the operation in which the user's hand is moved in an arbitrary direction, the control section 20 shifts the screen displayed on the touch panel 11 from the screen G3 to the screen G1. Because of this configuration, the user can simply perform the screen shift operation between the screen G1 and the screen G3 by performing the non-contact operation.

Further, when, during the display of the screen G1, the control section 20 detects that the right direction operation is performed, the control section 20 shifts the screen displayed on the touch panel 11 from the screen G1 to the screen G4. The screen G4 is a screen which displays information on the mail received by the portable terminal KT. The control section 20 controls the mail management section 28, so that, when there is new mail received by the portable terminal KT, the control section 20 acquires the mail and displays, on the screen G4, the information about the new mail (subject name, transmission source, text, and the like) together with the information about the mail received in the past.

On the screen G4, the second mode is set as the operation mode. Therefore, during the display of the screen G4, the user can perform operation to move the hand in an arbitrary direction, and can make the control section 20 perform the processing corresponding to the operation. When, during the display of the screen G4, the control section 20 detects the operation in which the user's hand is moved in an arbitrary direction, the control section 20 shifts the screen displayed on the touch panel 11 from the screen G4 to the screen G1. Because of this configuration, the user can simply perform the screen shift operation between the screen G1 and the screen G4 by performing the non-contact operation.

Further, when, during the display of the screen G1, the control section 20 detects that the left direction operation is performed, the control section 20 shifts the screen displayed on the touch panel 11 from the screen G1 to the screen G5. The screen G5 is a screen which displays contents provided by application AP installed in advance. The control section 20 displays the contents on the screen G5 by the function of the application AP.

On the screen G5, the second mode is set as the operation mode. Therefore, during the display of the screen G5, the user can perform operation to move the hand in an arbitrary direction, and can make the control section 20 perform the processing corresponding to the operation. When, during the display of the screen G5, the control section 20 detects the operation in which the user's hand is moved in an arbitrary direction, the control section 20 shifts the screen displayed on the touch panel 11 from the screen G5 to the screen G1. Because of this configuration, the user can simply perform the screen shift operation between the screen G1 and the screen G5 by performing the non-contact operation.

Figure 6:
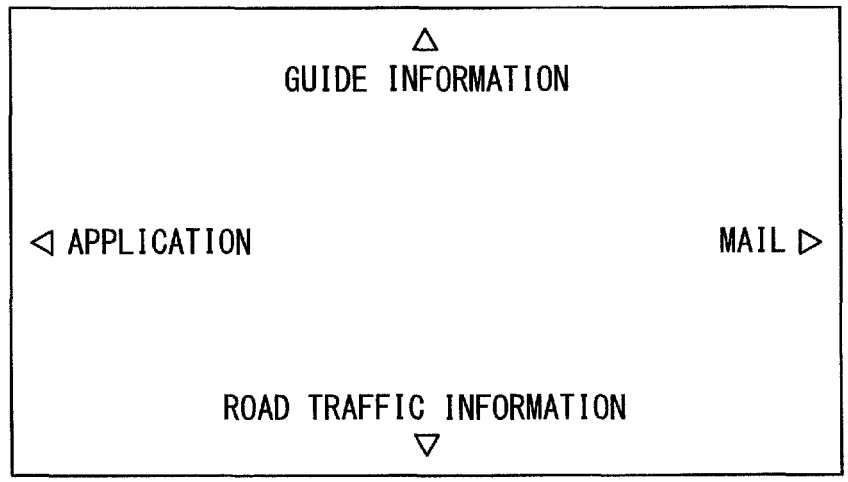
FIG. 6 is a view showing an example of screens displayed by the on-vehicle device.

It should be noted that the operation mode of each of the types of screens, and the processing performed in the on-vehicle device 1 at the time when the user performs predetermined non-contact operation, are notified to the user beforehand by a predetermined method. Here, it may be configured such that, together with the effective non-contact operation, the processing, which is performed when the control section 20 performs the non-contact operation, is displayed on the screen. FIG. 6 is a view showing an example of the above-described display on the screen G1. For the convenience of description, a map displayed in FIG. 5 is not displayed on FIG. 6. In FIG. 6, by the arrow indicating the lower direction, it is clearly indicated that the lower direction operation is enabled, and also that, when the lower direction operation is performed toward the character string displayed near the arrow, the shift to the screen G2 is performed. The shift in the upper, right and left direction operation is performed in the same manner.

FIG. 7 is a view explaining other examples of the operation of the on-vehicle device 1 when the user performs the non-contact operation.

FIG. 7(A) is a view showing the screen G6. During the route guidance displayed on the screen G1, when the separation distance, between the present position of the vehicle and the intersection through which the vehicle is to pass, is less than a predetermined distance set beforehand, the screen G1 is automatically shifted to the screen G6, so that the screen G6 is displayed. That is, the screen G6 is a screen automatically changed and displayed by a trigger when the predetermined condition is established. In the screen G6, a three-dimensional view of the intersection close to the vehicle is displayed in a substantially left half of the screen G6, and also, a map, which clearly indicates the present position of the vehicles and the route to the destination, is shown in a substantially right half of the screen G6.

On the screen G6, the second mode is set as the operation mode. Therefore, during the display of the screen G6, the user can perform operation to move the hand in an arbitrary direction, and can make the control section 20 perform the processing corresponding to the operation. When, during the display of the screen G6, the control section 20 detects the operation in which the user's hand is moved in an arbitrary direction, the control section 20 shifts the screen displayed on the touch panel 11 from the screen G6 to the screen G1.

When the operation mode, in which a screen G6 is automatically changed by a trigger generated when a predetermined condition is established, and in which a pop-up screen is displayed by pop-up as a trigger generated when a predetermined condition is established, is set to the second mode, the user can simply and quickly erase the automatically displayed screen, so that the convenience of the user can be more effectively improved.

FIG. 7(B) is a view showing the screen G7. The screen G7 is automatically displayed by pop-up when latest road traffic information is received by the beacon reception unit 25, or the FM multiplex reception unit 26 during display of a predetermined screen (set to the screen G1 in the following example). As shown in FIG. 7(B), a message inquiring whether or not the received road traffic information is to be displayed, such as a message: "latest traffic information is received, and do you want to display the information?", is displayed on the screen G7. Further, on the screen G7, the arrow, indicating the left direction in association with the above message, is displayed together with the message of "yes" which means that the road traffic information is displayed. When the left direction operation is performed by using the arrow, the message "yes" is selected, and it is clearly shown that the road traffic information is displayed. Further, in the screen G7, the arrow, indicating the right direction in association with the above message, is displayed together with the message of no which means that the road traffic information is not displayed. When the right direction operation is performed by using the arrow, the message no is selected, and it is clearly shown that the display of the road traffic information is canceled.

On the screen G7, the third mode is set as the operation mode. Therefore, during the display of the screen G7, the user can perform the left direction operation or the right direction operation, to make the control section 20 perform the processing corresponding to the operation. During the display of the screen G7, the control section 20 monitors whether or not the left direction operation or the right direction operation is performed. When the left direction operation is performed, that is, when the displaying road traffic information is selected by the user, the control section 20 shifts the display screen to the screen G2 of FIG. 5, and displays the received road traffic information. On the other hand, when the right direction operation is performed, that is, when the road traffic information is selected not to be displayed by the user, the control section 20 erases the screen G7, and displays the screen G1 which is displayed before the display of screen G7.

When, as shown in the screen G7, the operation mode of a pop-up screen which is displayed by pop-up as a trigger generated when a predetermined condition is established, and the operation mode of a screen which is automatically changed by a trigger generated when a predetermined condition is established, and which requires the user to select one of two screens, are set to the third mode, the user can simply and quickly perform the selection requested on the automatically displayed screen, so that the convenience of the user can be more effectively improved. It should be noted that, when a screen, which requires the user to select one of four screens, is automatically displayed by means, such as pop-up, the operation mode of the screen may be set to the first mode.

Next, the operation of the on-vehicle device 1, which operation related to the detection of the non-contact operation, will be described in detail by using a flowchart.

Figure 8:
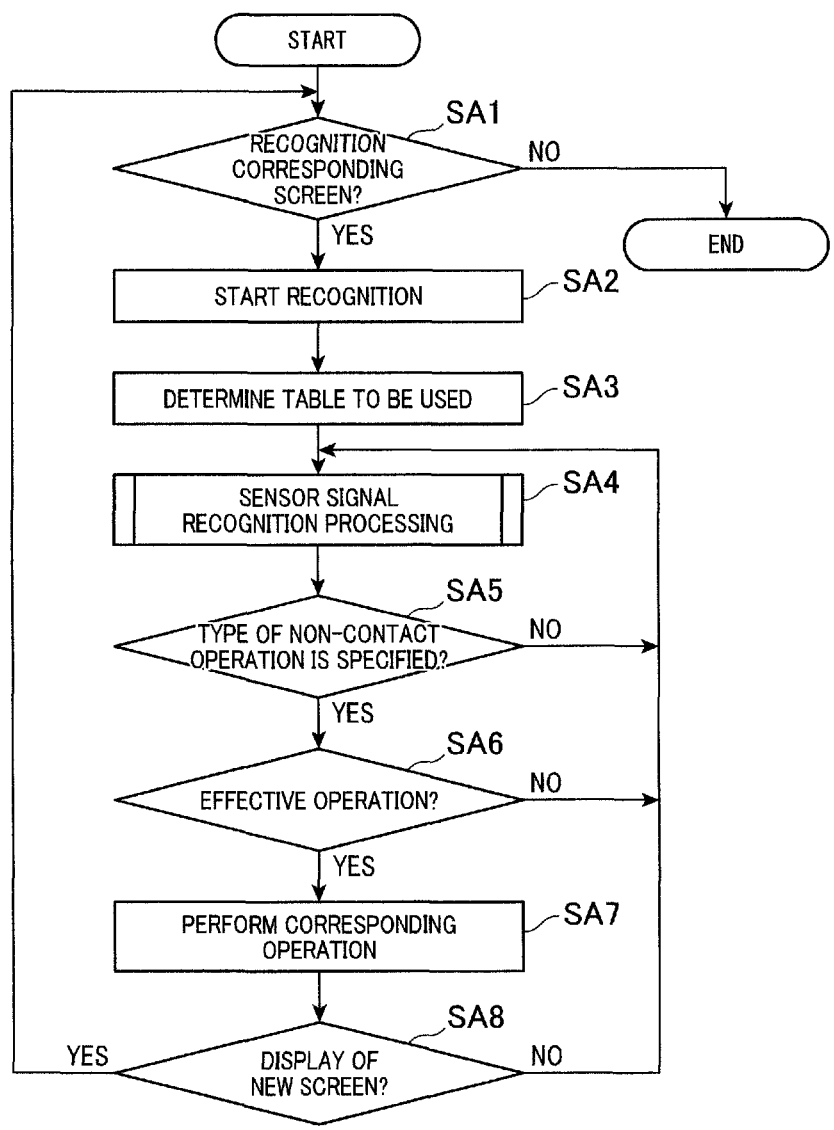
FIG. 8 is a flowchart showing the operation of the on-vehicle device.

FIG. 8 is a flowchart showing the operation of the on-vehicle device 1.

In FIG. 8, that a new screen is displayed is set as the conditions of the start of operation. The newly displayed screen includes a screen displayed after power turn-on, a screen newly displayed by screen shift, a screen newly displayed by automatic screen change, and a screen newly displayed by pop-up.

As shown in FIG. 8, when a new screen is displayed, the control section 20 of the on-vehicle device 1 determines whether or not the newly displayed screen is a recognition corresponding screen (step SA1). The recognition corresponding screen is a screen which is set to receive input by the non-contact operation. As described above, one of the first mode to the third mode is set, as an operation mode, to the recognition corresponding screen.

When the new screen is not the recognition corresponding screen (NO in step SA1), the control section 20 ends the processing.

When the new screen is the recognition corresponding screen (YES in step SA1), the control section 20 starts recognition of the non-contact operation (step SA2). That the recognition of the non-contact operation is started means that, when the non-contact operation is performed, the state, in which the non-contact operation can be detected and analyzed, is established. In step SA2, for example, the control section 20 starts to drive the first sensor section 141 to the fourth sensor section 144 by controlling the sensor control section 29.

Then, according to the operation mode set on the displayed screen, and by using one of a first table TB1, a second table TB2, and a third table TB3 which are stored in the storage section 22, the control section 20 determines whether or not the recognition of the non-contact operation (the specification of the type of the non-contact operation) is performed (step SA3). When the operation mode set on the screen is the first mode, the control section 20 determines the first table TB1 as the table to be used. When the operation mode set on the screen is the second mode, the control section 20 determines the second table TB2 as the table to be used. When the operation mode set on the screen is the third mode, the control section 20 determines the third table TB3 as the table to be used. The first table TB1 to the third table TB3 will be described below. As will become apparent below, in step SA3, the control section 20 determines the table to be used, and thereby, according to the operation mode, changes the range of movement of the user's hand at the time of specifying the type of the predetermined direction operation.

Then, the control section 20 performs sensor signal recognition processing (step SA4).

Figure 9:
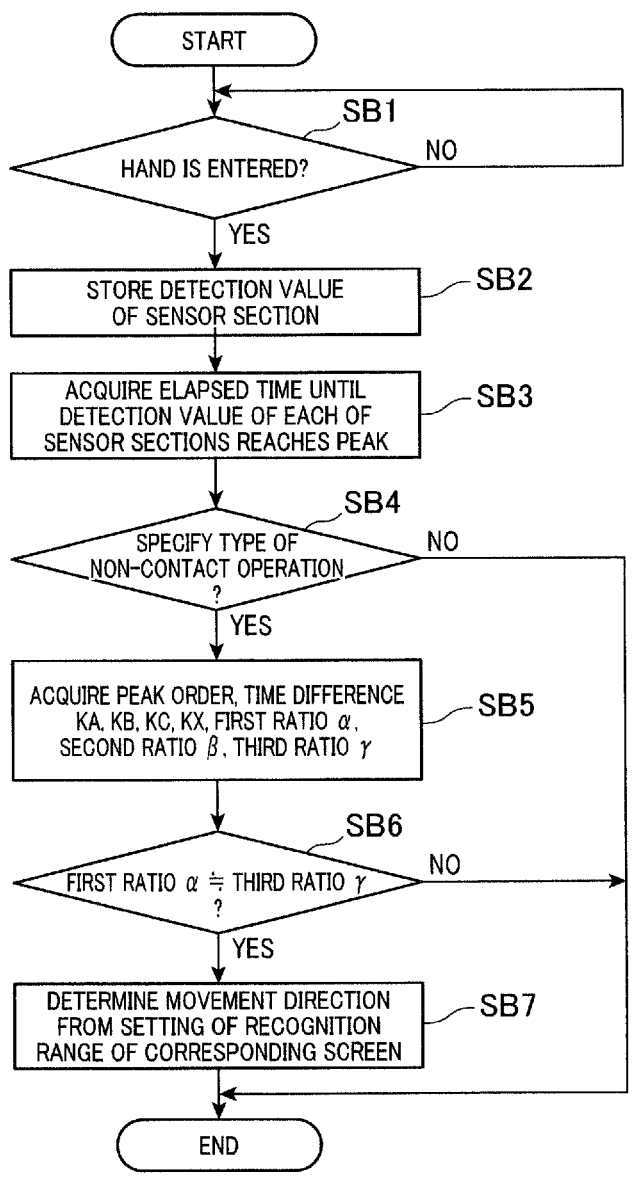
FIG. 9 is a flowchart showing the operation of the on-vehicle device.

FIG. 9 is a flowchart showing details of operation of the control section 20 when performing the sensor signal recognition processing of step SA4.

As shown in FIG. 9, in the sensor signal recognition processing, the control section 20 monitors the first received light intensity data to the fourth received light intensity data which are inputted at a predetermined period, and determines whether or not the user's hand has entered the detection range AA (step SB1). On the basis of the first received light intensity data to the fourth received light intensity data, the control section 20 monitors whether or not the detection value (reception intensity) of the sensor section is changed in one of the first sensor section 141 to the fourth sensor section 144. When the detection value is changed, the control section 20 determines that the user's hand has entered the detection range AA.

When determining that the user's hand has entered the detection range AA (YES in step SB1), then, on the basis of the first received light intensity data to the fourth received light intensity data which are inputted at the predetermined period, the control section 20 stores, in predetermined storage, the detection value (reception intensity) detected by each of the first sensor section 141 to the fourth sensor section 144 at the predetermined period, together with the information indicating the elapsed time from when the entry of the user's hand is detected (step SB2).

The control section 20 performs the process of step SB2 until the user's hand leaves the detection range AA. That is, on the basis of the first received light intensity data to the fourth received light intensity data, the control section 20 monitors whether or not the detection value (reception intensity) of all of the sensor sections of the first sensor section 141 to the fourth sensor section 144 is less than a threshold value set to detect the leaving of the hand. When the detection value is less than the threshold value, the control section 20 determines that the user's hand has left the detection range AA, and ends the processing in step SB2.

Figure 10:
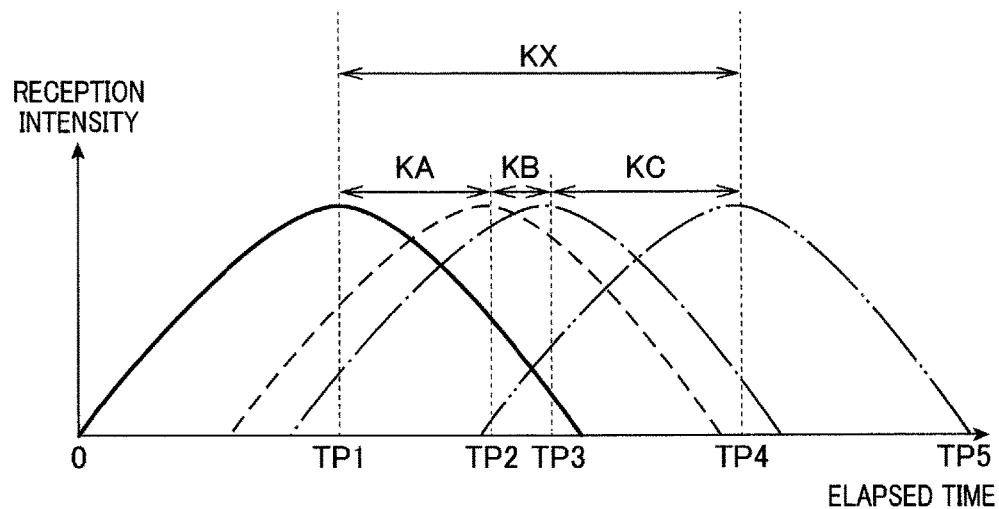
FIG. 10 is a view showing an example of waveforms of detection values of four sensor sections.

FIG. 10 is a view showing an example of the time elapsed change of the detection value of each of the first sensor section 141 to the fourth sensor section 144 in a graph in which the horizontal axis shows elapsed time, and the vertical axis shows the reception intensity. In step SB2, the control section 20 stores the detection value (reception intensity) of each of the sensor sections of the first sensor section 141 to the fourth sensor section 144 together with information representing elapsed time. For this reason, the graph of FIG. 10 can be drawn on the basis of the stored information.

In the example of FIG. 10, the detection value of the first sensor section 141 reaches a peak (maximum value) at elapsed time TP1. Further, the detection value of the second sensor section 142 reaches a peak at elapsed time TP2 (elapsed time TP1<elapsed time TP2<elapsed time TP3). Further, the detection value of the fourth sensor section 144 reaches a peak at elapsed time TP3 (elapsed time TP2<elapsed time TP3<elapsed time TP4). Further, the detection value of the third sensor section 143 reaches a peak at elapsed time TP4.

Then, on the basis of information stored in each of predetermined storage regions, the control section 20 acquires elapsed time when the detection value of each of the sensor sections reaches the peak (step SB3). In the case of the example of FIG. 10, the control section 20 acquires the elapsed time TP1 when the detection value of the first sensor section 141 reaches the peak, the elapsed time TP2 when the detection value of the second sensor section 142 reaches the peak, the elapsed time TP3 when the detection value of the fourth sensor section 144 reaches the peak, and the elapsed time TP4 when the detection value of the third sensor section 143 reaches the peak.

Then, on the basis of the information stored in the predetermined storage region in step SB2, the control section 20 determines whether or not to specify the type of non-contact operation (step SB4). In the following cases, the control section 20 specifies the type of non-contact operation on the assumption that intentional non-contact operation is not performed by the user.

In step SB4, when at least one of the first sensor section 141 to the fourth sensor section 144 cannot acquire the elapsed time, during which the detection value reached the peak, the control section 20 determines not to specify the type of non-contact operation. This is because, in such case, it is assumed that the user's hand does not move linearly in the detection range AA and does not pass near the center O (see FIG. 3(B)) of the detection range AA, and hence, the user is not performing the intended non-contact operation.

Further, in step SB4, when at least one of the first sensor section 141 to the fourth sensor section 144 has the peak (maximum value) of the detection value, which peak does not exceed a predetermined threshold value set beforehand, the control section 20 determines not to specify the type of non-contact operation. This is because, in such case, it is assumed that the user is not performing the intended non-contact operation.

Further, in step SB4, on the basis of information stored in the predetermined storage region, the control section 20 determines whether or not the user's hand performs the movement as described below. That is, after the user's hand moves from far to near the infrared sensor unit 14, the control section 20 determines whether or not the user's hand performs continuous movement for a predetermined period of time in the state where the user's hand is located within a predetermined distance from the infrared sensor unit 14. Then, when determining that the user's hand performs such movement, the control section 20 determines not to specify the type of non-contact operation. This is because such movement of the user's hand is not related to the intended non-contact operation of the user, and because such movement is performed when the user operates the operation switch 12 provided in the on-vehicle device 1.

In the above, the case of determining that the type of the non-contact operation is not specified is exemplified. However, in view of that the user's intentional non-contact operation is set as an analysis object, the case, in which the type of the non-contact operation is determined not to be specified, is set in advance on the basis of the results of the test and simulation which are performed in advance.

When the type of non-contact operation is not specified (NO in step SB4), the control section 20 ends the sensor signal recognition processing.

When the type of non-contact operation is specified (YES in step SB4), the control section 20 performs the following processes (step SB5).

In step SB5, the control section 20 acquires the order of the sensor sections, each detection value of which reaches the peak (hereinafter referred to as "peak order"). In the example of FIG. 10, the peak order is such that the first sensor section 141→the second sensor section 142→the fourth sensor section 144→the third sensor section 143. In the following, the first sensor section 141, the second sensor section 142, the third sensor section 143, and the fourth sensor section 144 are appropriately represented as the sensor S1, the sensor S2, the sensor S3, and the sensor S4, respectively.

FIG. 11 is a view showing the peak order patterns which can be set in the present embodiment. Since, in the present embodiment, each of the sensor sections is arranged in the manner shown in FIG. 3(A), and since the detection range of each of the sensor sections is arranged in the manner shown in FIG. 3(B), the peak order patterns are set as sixteen types of pattern P1 to pattern P16 as shown in FIG. 11.

Further, in step SB5, the control section 20 calculates the difference KA between the elapsed time when the detected values of the sensor section of the first peak order reaches the peak (elapsed time TP1 in the example in FIG. 10), and the elapsed time when the detected values of the sensor section of the second peak order reaches the peak (elapsed time TP2 in the example in FIG. 10). Further, the control section 20 calculates the difference KB between the elapsed time when the detected values of the sensor section of the second peak order reaches the peak (elapsed time TP2 in the example in FIG. 10), and the elapsed time when the detected values of the sensor section of the third peak order reaches the peak (elapsed time TP3 in the example in FIG. 10). Further, the control section 20 calculates the difference KC between the elapsed time when the detected values of the sensor section of the third peak order reaches the peak (elapsed time TP3 in the example in FIG. 10), and the elapsed time when the detected values of the sensor section of the fourth peak order reaches the peak (elapsed time TP4 in the example in FIG. 10). Further, the control section 20 calculates the difference KX between the elapsed time when the detected values of the sensor section of the first peak order reaches the peak (elapsed time TP1 in the example in FIG. 10), and the elapsed time when the detected values of the sensor section of the fourth peak order reaches the peak (elapsed time TP4 in the example in FIG. 10).

Further, in step SB5, the control section 20 obtains the rate of the time difference KA in the time difference KX (time difference KA/time difference KX, which is hereinafter referred to as "first ratio $\alpha$"), the rate of the time difference KB in the time difference KX (time difference KB/time difference KX, which is hereinafter referred to as "second ratio $\beta$"), and the rate of the time difference KC in the time difference KX (time difference KC/time difference KX, which is hereinafter referred to as "third ratio $\gamma$").

In subsequent step SB6, the control section 20 compares the first ratio $\alpha$ with the third ratio $\gamma$, and determines whether or not the difference between the ratios is less than a predetermined threshold value set beforehand (step SB6). Here, when the non-contact operation, in which the user's hand moves linearly in the detection range AA and passes near the center O (see FIG. 3(B)) of the detection range AA, is performed, the value of the first ratio $\alpha$ is substantially equal to the value of the third ratio $\gamma$. In consideration of this, in step SB6, the control section 20 determines whether or not the non-contact operation in which the user's hand moves linearly in the detection range AA and passes near the center O (see FIG. 3(B)) of the detection range AA, in other words, the intentional non-contact operation is performed by the user. It should be noted that, in view of detecting the user's intentional non-contact operation, the predetermined threshold value is set on the basis of the results of the test and simulation which are performed in advance.

When the difference of the value of the first ratio $\alpha$ and the value of the third ratio $\gamma$ is not less than the predetermined threshold value (NO in step SB6), the control section 20 ends the sensor signal recognition processing without specifying the type of non-contact operation.

When the difference of the value of the first ratio $\alpha$ and the value of the third ratio $\gamma$ is less than the predetermined threshold value (YES in step SB6), the control section 20 specifies the type of non-contact operation by using the table determined in step SA3 (step SB7). In the following, on the basis of the explanation of the first table TB1, the data structure of each of the tables is explained, and the method for specifying the types of the non-contact operation is explained.

FIG. 12 is a view showing the data structure of the first table TB1. As described above, the first table TB1 is a table used when the operation mode is set to the first mode.

As shown in FIG. 12, one record of the first table TB1 has a pattern field FA1 in which information indicating the patterns of peaks order (hereinafter referred to as "peak order pattern") is stored.

Further, one record of the first table TB1 has a time difference comparison information field FA2. In the time difference comparison information field F2, there are stored information (represented as "KA<KB" in FIG. 12) indicating that the value of time difference KA is less than the value of time difference KB, information (represented as "KA≥KB" in FIG. 12) indicating that the value of time difference KA is not less than the value of time difference KB, and information (represented as "ANY" in FIG. 12) indicating that the magnitude relationship between the time difference KA and the time difference KB is ignored.

Further, one record of the first table TB1 has a predetermined direction operation field FA3. In the predetermined direction operation field FA3, information indicating all eight types of predetermined direction operation is stored.

Further, one record of the first table TB1 has a first ratio field FA4. In the first ratio field FA4, information indicating the range of the first ratio α is stored.

Further, one record of the first table TB1 has a second ratio field FA5. In the second ratio field FA5, information indicating the range of the second ratio β is stored.

The one record of the first table TB1 indicates the following: that is, the one record of the first table TB1 indicates that the information indicating the peak order acquired by the control section 20 in step B5 is stored in the pattern field FA1; that the information indicating the magnitude relationship between the acquired time difference KA and the acquired time difference KB is stored in the time difference comparison information field FA2; and that, when the acquired first ratio α is in the range indicated by the information stored in the first ratio field FA4, and when the acquired second ratio β is in the range indicated by the information stored in the second ratio field FA5, the non-contact operation performed by the user is the predetermined direction operation indicated by the information stored in the predetermined direction operation field FA3.

For example, the first record R1 in FIG. 12 indicates that, when the peak order pattern is the pattern P1, when the time difference KA is less than the time difference KB, and when the first ratio α is in the range of "value A1min≤α≤value A1max", and also, the second ratio β is in the range of "value B1min≤β≤value B1max", the performed non-contact operation is the lower direction operation. Further, the second record R2 indicates that, when the peak order pattern is pattern P1, when the time difference KA is not less than the time difference KB, and when the first ratio α is in the range of "value A2min≤α≤value A2max", and also, the second ratio β is in the range of "value B2min≤β≤value B2max", the performed non-contact operation is the lower right direction operation. Further, the third record R3 indicates that, when the peak order pattern is the pattern P2, and when the first ratio α is in the range of "value A3min≤α≤value A3max", and also, the second ratio β is in the range of "value B3min≤β≤value B3max", the performed non-contact operation is the lower direction operation irrespective of the magnitude relationship between the time difference KA and the time difference KB.

In each the records of the first table TB1, the range of the first ratio α and the range of the second ratio β mean the following or are set as follows.

FIG. 14 is a view which explains the first record R1 of the first table TB1 in FIG. 12, and in which FIG. 14(A) shows a waveform of the detection value of each of the sensor sections, and FIG. 14(B) shows the detection range AA.

In the record R1, the time difference KA<the time difference KB. For this reason, the detection value of each of the sensor sections has the waveform as shown in FIG. 14(A). Further, in the record R1, the peak order pattern is the pattern P1 (the sensor S1→the sensor S2→the sensor S4→the sensor S3). For this reason, it is assumed that, in the case of the non-contact operation in which the peak order pattern is the pattern P1, and in which the time difference KA<the time difference KB, the user's hand has moved, as shown by the arrow YJ1 in FIG. 14(B), in a lower right direction inclined counter-clockwise at a predetermined angle with respect to the axis Y extending in the vertical direction through the center O of the detection range AA. That is, it is assumed that the user's hand moved in correspondence with the lower direction operation. Further, in the case where the peak order pattern is the pattern P1, and where the time difference KA<the time difference KB, the range of inclination regarded as the lower direction operation (the range of angle θ1 in FIG. 14(B)) can be defined with fixed accuracy by defining the ranges of the first ratio α (≈third ratio γ), and the second ratio β. According to the above, information indicating each of the range of the first ratio α and the range of the second ratio β that define the range of the angle θ1 (the range of movement of the user's hand, which movement is regarded as lower direction operation) is stored in each of the first ratio field FA4 and the second ratio field FA5 of the record R1.

FIG. 15 is a view which is used for explaining the second record R2 of the first table TB1 in FIG. 12, and in which FIG. 15(A) shows a waveform of the detection value of each of the sensor sections, and FIG. 15(B) shows the detection range AA.

In the record R2, the time difference KA≥the time difference KB. For this reason, the detection value of each of the sensor sections has the waveform as shown in FIG. 15(A). Further, in the record R2, the peak order pattern is the pattern P1 (the sensor S1→the sensor S2→the sensor S4→the sensor S3). For this reason, it is assumed that, in the case of the non-contact operation in which the peak order pattern is the pattern P1, and in which the time difference KA≥the time difference KB, the user's hand has moved in a lower right direction inclined counter-clockwise with respect to the axis Y more as compared with the above-exemplified case where the time difference KA<the time difference KB, as shown by the arrow YJ2 in FIG. 15(B). That is, it is assumed that the user's hand moved in correspondence with the lower direction operation. Further, the range of inclination regarded as the lower direction operation (the range of angle θ2 in FIG. 15(B)) can be defined with fixed accuracy by defining the ranges of the first ratio α (≈third ratio γ), and the second ratio β. According to the above, information indicating each of the range of the first ratio α and the range of the second ratio β that define the range of the angle θ2 (the range of movement of the user's hand, which movement is regarded as lower right direction operation) is stored in each of the first ratio field FA4 and the second ratio field FA5 of the record R2.

FIG. 13(A) shows a data structure of a second table TB2, and FIG. 13(B) shows a data structure of a third table TB3.

As is apparent from comparison of the tables of FIG. 12 and FIG. 13, each of the tables has the same data structure. However, the contents of information stored in the first ratio field FA4 are different from the contents of information stored in the second ratio field FA5, in each corresponding record between the tables. That is, the tables are different in the range of movement of the hand, in which range one type of the predetermined direction operation by the hand is recognized.

Especially, between the first table TB1 related to the first mode and the third table TB3 related to the third mode, the contents of information stored in the first ratio field FA4 are different from the contents of information stored in the second ratio field FA5 as follows.

FIG. 16 is a view used for explaining the difference of the first mode and the third mode in the range of movement of the hand, in which range the predetermined direction operation by the hand is recognized. In FIG. 16(A), the range of movement of the user's hand, in which range the movement is recognized as the right direction operation and the left direction operation in the first mode, is schematically shown by using the angle θ3 formed about the center O of the detection range AA. In FIG. 16(B), the range of movement of the user's hand, in which range the movement is recognized as the right direction operation and the left direction operation in the third mode, is schematically shown by using the angle θ4 formed about the center O of the detection range AA.

As shown in FIG. 16, the range of movement of the user's hand, in which range the movement is recognized as the right direction operation and the left direction operation in the third mode, is larger as compared with the first mode. That is, the angles are set as angle θ4>angle θ3. It should be noted that, in order that the angles are set as angle θ4>angle θ3, information of appropriate contents is stored in the first ratio field FA4 and the second ratio field FA5 so that each of the records in the first table TB1 corresponds to each of the records in the third table TB3.

In this way, the reason why the range of movement of the user's hand, in which range the movement is recognized as the right direction operation and the left direction operation in the third mode, is larger as compared with the first mode is as follows. That is, in the third mode, effective types of predetermined direction operation are two types of the right direction operation and the left direction operation. Therefore, when the operation mode set on the screen during the display of the screen is the third mode, the intentional non-contact operation performed by the user is the right direction operation and the left direction operation. For this reason, when the range, in which the right direction operation and the left direction operation are recognized, is set wider as compared with the first mode, and when the user performs the right direction operation and the left direction operation, the possibility that one of the two types of the right direction operation and the left direction operation can be recognized as an effective operation is increased, and hence, the convenience of the user is improved.

As described above, in the present embodiment, even when, in the predetermined direction operation that the user's hand is moved in the vertical and horizontal directions, the movement of the user's hand is inclined to some extent, one of the types of predetermined direction operation can be recognized as an effective operation. For this reason, when the user performs the predetermined direction operation, the user does not need to accurately move the hand along the vertical and horizontal directions, and hence, the user's operability and convenience are improved. Especially, in the present embodiment, the user performing the non-contact operation is in the vehicle and cannot easily change the attitude. However, as described above, the user does not need to accurately move the hand along the vertical and horizontal directions, and hence, the user's operability and convenience are effectively improved. Further, in the present embodiment, the operation of moving the hand in the oblique directions (lower right direction operation, and the like) is set as the predetermined direction operation, and hence, such operation is not enabled in the first mode and the third mode. For this reason, when the user's hand is inclined to exceed the allowable range of inclination, and thereby, when the intended operation of the user cannot be clearly distinguished, the processing based on the operation is not performed. Therefore, it is possible to prevent that the processing contrary to the user's intention is performed.

Further, in step SB7 of FIG. 9, on the basis of the peak order, the time difference KA, and the time difference KB which are acquired in step SB5, the control section 20 first specifies one corresponding record among the records of the table selected in step SA3 of FIG. 8. That is, among the records of the selected table, the control section 20 specifies one record in which the information indicating the peak order pattern corresponding to the acquired peak order is stored in the pattern field FA1, and in which the information indicating the magnitude relationship between the acquired time difference KA and the acquired time difference KB is stored in the time difference comparison information field FA2. Then, the control section 20 determines whether or not the first ratio α acquired in step SB5 is in the range indicated by the information stored in the first ratio field FA4 of the specified record, and whether or not the acquired second ratio β is in the range indicated by the information stored in the second ratio field FA5 of the specified record. When the first ratio α and the second ratio β are respectively in the corresponding ranges, the control section 20 specifies, as the type of the non-contact operation performed by the user, the predetermined direction operation indicated by the information stored in the predetermined direction operation field FA3 of the specified record. On the other hand, when one of the first ratio α and the second ratio β is not in the corresponding range, the control section 20 does not specify the type of the non-contact operation.

After the processing of step SB7, the control section 20 ends the sensor signal recognition processing.

As shown in FIG. 8, after the end of the sensor signal recognition processing in step SA4, the control section 20 determines whether or not the type of the non-contact operation is specified by the sensor signal recognition processing (step SA5). When the type of the non-contact operation is not specified (NO in step SA5), the control section 20 returns the processing procedure to step SA4, and again, performs the sensor signal recognition processing.

When the type of the non-contact operation is specified by the sensor signal recognition processing (YES in step SA5), the control section 20 determines whether or not the specified type of the non-contact operation is the non-contact operation which is effective in the operation mode set on the display screen (step SA6). As described above, in the first mode, the lower direction operation, the upper direction operation, the right direction operation, and the left direction operation are the effective types of the non-contact operation. In the second mode, in addition to the above-described four types of operation, the lower right direction operation, the upper right direction operation, the upper left direction operation, and the lower left direction operation are the effective types of the non-contact operation. In other words, in the second mode, the operation of moving the hand in an arbitrary direction is effective. In the third mode, the right direction operation and the left direction operation are the effective types of the non-contact operation.

When the specified type of the non-contact operation is not the non-contact operation enabled in the corresponding operation mode (NO in step SA6), the control section 20 returns the processing procedure to step SA4.

When the specified type of the non-contact operation is the non-contact operation enabled in the corresponding operation mode (YES in step SA6), the control section 20 performs the corresponding processing (step SA7). The corresponding processing is, for example, the screen shift explained by using FIG. 5. It should be noted that the corresponding processing may be not only the screen shift but also any processing as long as the processing can be performed by the control section 20.

Then, the control section 20 determines whether or not the processing performed in step SA7 is processing including displaying a new screen (step SA8). When the processing is the processing including displaying the new screen (YES in step SA8), the control section 20 shifts the processing procedure to step SA1.

When the processing performed in step SA7 is not the processing including displaying the new screen (NO in step SA8), the control section 20 shifts the processing procedure to step SA4, and again, performs the sensor signal recognition processing.

As described above, the on-vehicle device 1 (non-contact operation detection device) according to the present embodiment includes the control section 20 which detects the non-contact operation, and which is configured, in the first mode, to analyze the detected non-contact operation and determine, on the basis of the first rule, whether or not the non-contact operation is the effective operation and is configured, in the second mode, to analyze the detected non-contact operation and determine, on the basis of the second rule, whether or not the non-contact operation is the effective operation.

In this configuration, according to the operation mode, the different non-contact operation can be set as the effective operation.

Further, in the present embodiment, in the second rule according to the second mode, the range, in which the non-contact operation is enabled, is set larger as compared with the first rule according to the first mode.

In this configuration, when the second mode is set as the operation mode, the non-contact operation by the movement of the user's hand can be enabled in a wider range as compared with the case where the first mode is set as the operation mode.

Further, in the present embodiment, the first rule according to the first mode is the rule that enables the non-contact operation according to the operation in which the user's hand (detection object) is moved in the predetermined direction. The second rule is the rule that enables the non-contact operation according to the operation in which the user's hand is moved in an arbitrary direction. More specifically, the first rule is the rule that enables the non-contact operation according to the operation in which the user's hand is moved in the vertical and horizontal four directions.

In this configuration, when the operation mode is set to the first mode, it is possible to enable the non-contact operation corresponding to the operation in which the user's hand is moved in the vertical and horizontal four directions, while when the operation mode is set to the second mode, it is possible to enable the non-contact operation corresponding to the operation in which the user's hand is moved in an arbitrary direction.

Further, the on-vehicle device 1 according to the present embodiment includes four sensor sections of the first sensor section 141 (first sensor), the second sensor section 142 (second sensor), the third sensor section 143 (third sensor), and the fourth sensor section 144 (fourth sensor), each of which outputs a larger detected value as the distance with respect to the user's hand is reduced. Further, the second sensor section 142 is provided at the right side of the first sensor section 141, and the third sensor section 143 is provided on the lower side of the second sensor section 142. Further, the fourth sensor section 144 is provided on the left side of the third sensor section 143, and the first sensor section 141 is provided on the upper side of the fourth sensor section 144. On the basis of the detection values of the four sensor sections, the control section 20 detects whether or not the detected non-contact operation corresponds to the operation in which the user's hand is moved in the vertical and horizontal four directions.

In this configuration, in consideration of the configuration including the four sensor sections, and the arrangement state of the four sensor sections, it is possible to accurately detect whether or not the detected non-contact operation corresponds to the operation in which the user's hand is moved in the vertical and horizontal four directions.

Further, in the present embodiment, on the basis of the change in the peak of the detection value of each of the four sensor sections, the control section 20 detects whether or not the detected non-contact operation corresponds to the operation in which the detection object is moved in the vertical and horizontal four directions.

In this configuration, in consideration of the configuration including the four sensor sections, and the arrangement state of the four sensor sections, and by using the change in the peak of the detection value of each of the four sensor sections, it is possible to accurately detect whether or not the detected non-contact operation corresponds to the operation in which the user's hand is moved in the vertical and horizontal four directions.

Further, in the present embodiment, and in the third mode, the control section 20 determines, on the basis of the third rule, whether or not the non-contact operation is an effective operation. The third rule is the rule that enables the non-contact operation corresponding to the operation in which the user's hand is moved in the left and right directions.

In this configuration, when the operation mode is set to the third mode, it is possible to enable the non-contact operation corresponding to the operation in which the user's hand is moved in the vertical and horizontal four directions.

Further, in the present embodiment, the on-vehicle device 1 includes the touch panel 11 (display section). Thereby, the operation mode is set for each of the types of the screens which are displayed on the touch panel 11.

In this configuration, the operation mode is set for each of the screens, so that the different types of non-contact operation can be enabled.

It should be noted that the embodiment described above is merely described as an embodiment of the present invention, and modification and application are arbitrarily possible within the scope of the present invention.

For example, FIG. 2 is a schematic view showing the functional configuration of the on-vehicle device 1 in such a manner that, in order to facilitate understanding of the present invention, the configuration is classified according to the main processing contents. The configuration of each of the devices can also be classified into more components according to the processing contents. Further, one of the components can be classified to perform many processes. Further, the processing of each of the components may be performed by a hardware component or by a plurality of hardware components. Further, the processing of each of the components may be realized by one program or by a plurality of programs.

Further, in order to facilitate understanding of the processing of the on-vehicle device 1, the processing unit of the flowchart is divided according to the main processing contents. The present invention is not limited by the division pattern of the processing unit, and the name of the processing unit. The processing of the on-vehicle device 1 can be further divided into many processing units according to the processing contents. Further, one processing unit can be further divided to include many processing. Further, the order of the processing is not limited to the illustrated example.

Further, the above-described embodiment is configured such that the non-contact operation is detected by using an infrared ray, and the detecting method and analyzing method of the non-contact operation are not limited to the illustrated methods in the above-described embodiment. Further, in place of the infrared ray, the on-vehicle device 1 may also be configured to detect the non-contact operation by using other means, such as means using ultrasonic waves, or means using data of images captured by an imaging device.

Further, in the above-described embodiment, the non-contact operation, in which the user's hand is moved in the vertical and horizontal four directions, is enabled in the first mode, while the non-contact operation, in which the user's hand is moved in the left and right directions, is enabled in the second mode. However, the direction of the user's hand movement, which is performed when the non-contact operation is enabled, is not limited to the vertical and horizontal four directions, and for example, in a direction such as an oblique direction, the user's hand may also be moved when the non-contact operation is enabled.

REFERENCE SIGNS LIST

1 On-vehicle device (non-contact operation detection device)
20 Control section
141 First sensor section (first sensor)
142 Second sensor section (second sensor)
143 Third sensor section (third sensor)
144 Fourth sensor section (fourth sensor)

The invention claimed is:

1. A vehicle-mounted non-contact operation detection device, comprising:
   a plurality of sensors detecting a detection object, and each of the plurality of sensors in which an output detection value is changed according to a position of the detection object in a detection range of each of the plurality of sensors; and
   a control section detecting non-contact operation, and based on a mode of the output detection value of each of the plurality of sensors, the control section acquiring elapsed time when the output detection value of each of the plurality of sensors reaches a peak,
   wherein the control section executes one of a first mode and a second mode as an operation mode,
   in the first mode, the control section specifies a type of non-contact operation based on a first rule to determine whether or not the non-contact operation is an effective operation, and in the second mode, the control section specifies the type of non-contact operation based on a second rule to determine whether or not the non-contact operation is an effective operation, and the control section determines not to specify the type of non-contact operation when at least one of the plurality of sensors cannot acquire a time when the detection value reaches the peak in the first mode and the second mode,
   in the detection range of the plurality of sensors, a detection range in which the non-contact operation is detected differs in the first mode and the second mode, and
   the control section detects the non-contact operation in the detection range of the operation mode executed.

2. The non-contact operation detection device according to claim 1, wherein the detection range of the plurality of sensors includes a portion in which the detection range in which the non-contact operation is detected in the first mode and the detection range in which the non-contact operation is detected in the second mode overlap with each other,
   in the second mode, a range in which the non-contact operation is enabled is set, in the detection range of the plurality of sensors, wider than in the first mode.

3. The non-contact operation detection device according to claim 2, wherein the first rule is a rule that enables the non-contact operation corresponding to operation in which the detection object is moved in a predetermined direction, and
   the second rule is a rule that enables the non-contact operation corresponding to operation in which the detection object is moved in an arbitrary direction.

4. The non-contact operation detection device according to claim 3, wherein the first rule is a rule that enables the non-contact operation corresponding to operation in which the detection object is moved in predetermined four directions.

5. The non-contact operation detection device according to claim 4, wherein the predetermined four directions are directions corresponding to upper, lower, left, and right directions.

6. The non-contact operation detection device according to claim 5, further comprising:
   four sensors which are a first sensor, a second sensor, a third sensor, and a fourth sensor, each of which outputs a larger detected value as the distance with respect to the detection object is reduced,
   wherein the four sensors are arranged horizontally and vertically side-by-side such that the second sensor is located on the right side of the first sensor, the third sensor is located on the lower side of the second sensor, the fourth sensor is located on the left side of the third sensor, and the first sensor is located on the upper side of the fourth sensor, and
   on the basis of modes of the detection values of the four sensors, the control section detects whether or not the detected non-contact operation corresponds to the operation in which the detection object is moved in the vertical and horizontal four directions.

7. The non-contact operation detection device according to claim 6, wherein
   on the basis of a change in the peak of the detection value of each of the four sensors, the control section detects whether or not the detected non-contact operation corresponds to the operation in which the detection object is moved in the vertical and horizontal four directions.

8. The non-contact operation detection device according to claim 2, wherein
   the control section executes, as the operation mode, one of the first mode, the second mode and a third mode,
   in the third mode, the control section determines, on the basis of the third rule, whether or not the non-contact operation is the effective operation, and when the non-contact operation is the effective operation, performs processing based on an analysis result,
   the first rule is a rule that enables the non-contact operation corresponding to operation in which the detection object is moved in predetermined four directions, and
   the second rule is a rule that enables the non-contact operation corresponding to operation in which the detection object is moved in an arbitrary direction, and
   the third rule is a rule that enables the non-contact operation corresponding to operation in which the detection object is moved in predetermined two directions.

9. The non-contact operation detection device according to claim 8, wherein
   the predetermined four directions are directions corresponding to the vertical and horizontal directions, and
   the predetermined two directions are directions corresponding to the right and left directions.

10. The non-contact operation detection device according to claim 9, further comprising:

four sensors which are a first sensor, a second sensor, a third sensor, and a fourth sensor, each of which outputs a larger detected value as the distance with respect to the detection object is reduced, wherein the four sensors are arranged horizontally and vertically side-by-side such that the second sensor is located on the right side of the first sensor, the third sensor is located on the lower side of the second sensor, the fourth sensor is located on the left side of the third sensor, and the first sensor is located on the upper side of the fourth sensor, and on the basis of modes of the detection values of the four sensors, the control section detects whether or not the detected non-contact operation corresponds to the operation in which the detection object is moved in the vertical and horizontal four directions, or detects whether or not the detected non-contact operation corresponds to the operation in which the detection object is moved in the left and right directions.

11. The non-contact operation detection device according to claim 10, wherein on the basis of a change in the peak of the detection value of each of the four sensors, the control section detects whether or not the detected non-contact operation corresponds to the operation in which the detection object is moved in the vertical and horizontal four directions, or detects whether or not the detected non-contact operation corresponds to the operation in which the detection object is moved in the left and right directions.

12. The non-contact operation detection device according to claim 1, further comprising:
a display section which displays screens of predetermined types,
wherein a mode is set for each of the types of the screens.

13. The non-contact operation detection device according to claim 1, further comprising:
a display section that displays a plurality of types of screens having different display contents,
wherein the operation mode executed by the control section is set for each of the screens,
when shifting the screen to be displayed on the display section, the control section detects the non-contact operation in the operation mode set corresponding to the screen newly display by screen shift.

* * * * *